US012409980B2

(12) United States Patent
Zuffa

(10) Patent No.: US 12,409,980 B2
(45) Date of Patent: Sep. 9, 2025

(54) CAP FOR A CONTAINER

(71) Applicant: SACMI COOPERATIVA MECCANICI IMOLA SOCIETA' COOPERATIVA, Imola (IT)

(72) Inventor: Zeno Zuffa, Borgo Tossignano (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 0 days.

(21) Appl. No.: 18/742,117

(22) Filed: Jun. 13, 2024

(65) Prior Publication Data

US 2024/0336405 A1  Oct. 10, 2024

Related U.S. Application Data

(62) Division of application No. 17/768,392, filed as application No. PCT/IB2020/059597 on Oct. 13, 2020, now Pat. No. 12,054,317.

(30) Foreign Application Priority Data

Oct. 14, 2019  (IT) .................. 102019000018737

(51) Int. Cl.
*B29C 43/42* (2006.01)
*B29C 33/44* (2006.01)
(Continued)

(52) U.S. Cl.
CPC .......... *B65D 41/3428* (2013.01); *B29C 33/44* (2013.01); *B29C 43/42* (2013.01);
(Continued)

(58) Field of Classification Search
None
See application file for complete search history.

(56) References Cited

U.S. PATENT DOCUMENTS

| 4,418,828 A | 12/1983 | Wilde et al. |
| 4,511,053 A | 4/1985 | Brandes et al. |

(Continued)

FOREIGN PATENT DOCUMENTS

| CA | 2538278 | 10/2006 |
| CA | 2676854 | 2/2011 |

(Continued)

OTHER PUBLICATIONS

Saito JP2005059876A 2005 English Translation (Year: 2005).*
(Continued)

*Primary Examiner* — Jacob T Minskey
*Assistant Examiner* — Adrien J Bernard
(74) *Attorney, Agent, or Firm* — Chrisman Gallo Tochtrop LLC

(57) ABSTRACT

A cap for a container comprises: a body, configured to be coupled and uncoupled relative to the neck of the container and including a side wall, which extends around a longitudinal axis, and a transverse wall; a tamper evident ring, configured to remain anchored to the neck of the container even when the body is uncoupled from the neck and including a joining portion where the tamper evident ring is joined to the body, the joining portion being configured to be torn along a full perimeter surrounding the longitudinal axis, wherein the cap comprises a connecting band having a first end connected to the side wall of the body and a second end connected to the retaining portion of the tamper evident ring.

21 Claims, 16 Drawing Sheets

(51) Int. Cl.
   *B29C 45/00* (2006.01)
   *B29C 45/33* (2006.01)
   *B29C 45/44* (2006.01)
   *B65D 41/34* (2006.01)
   *B29C 43/36* (2006.01)
   *B29L 31/56* (2006.01)

(52) U.S. Cl.
   CPC .......... *B29C 45/0081* (2013.01); *B29C 45/33* (2013.01); *B29C 45/44* (2013.01); *B29C 2043/3665* (2013.01); *B29L 2031/56* (2013.01); *B65D 2401/20* (2020.05)

(56) References Cited

U.S. PATENT DOCUMENTS

| | | |
|---|---|---|
| 4,564,114 A | 1/1986 | Cole |
| 5,086,938 A | 2/1992 | Aichinger |
| 5,725,115 A | 3/1998 | Boesl et al. |
| 6,474,491 B1 | 11/2002 | Benoit-Gonin et al. |
| 6,736,628 B1 | 5/2004 | Zuffa |
| 8,424,697 B2 | 4/2013 | Pucci |
| 8,794,460 B2 | 8/2014 | Druitt et al. |
| 11,242,176 B2 | 2/2022 | Albonetti et al. |
| 2009/0314776 A1 | 12/2009 | Pucci |
| 2010/0005641 A1 | 1/2010 | Druitt et al. |
| 2011/0174760 A1 | 7/2011 | Luzzato et al. |
| 2011/0297682 A1 | 12/2011 | Kwon |
| 2012/0055899 A1* | 3/2012 | Parmaningsih ...... B65D 41/485 215/255 |
| 2018/0370701 A1 | 12/2018 | Maguire |
| 2019/0039786 A1 | 2/2019 | Albonetti et al. |
| 2022/0073238 A1 | 3/2022 | Naumann |

FOREIGN PATENT DOCUMENTS

| | | | | |
|---|---|---|---|---|
| CN | 1830730 | 9/2006 | | |
| CN | 101076478 | 11/2007 | | |
| CN | 101258079 | 9/2008 | | |
| CN | 102530364 | 7/2012 | | |
| CN | 102815448 | 12/2012 | | |
| IT | MI2010A000359 | 6/2012 | | |
| IT | MO2010A000360 | 6/2012 | | |
| IT | 102019000012585 | 1/2021 | | |
| JP | S62251351 | 11/1987 | | |
| JP | H11188752 | 7/1999 | | |
| JP | 2005059876 | 3/2005 | | |
| JP | 2005059876 A | * | 3/2005 | ............ B65D 41/34 |
| JP | 2006143321 | 6/2006 | | |
| JP | 2006143321 A | * | 6/2006 | ............ B65D 55/16 |
| KR | 200839542 | 6/2008 | | |
| KR | 100997319 | 11/2010 | | |
| TW | M447443 | 5/2014 | | |
| TW | 201733868 | 10/2017 | | |
| TW | M567232 | 9/2018 | | |
| WO | 9626122 | 8/1996 | | |
| WO | 2007080000 | 7/2007 | | |
| WO | 2009002057 | 12/2008 | | |
| WO | 2019159528 | 8/2019 | | |

OTHER PUBLICATIONS

Saeki JP2006143321A 2006 English Translation (Year: 2006).*
Office action issued in Taiwan Application No. 109135377 on Oct. 4, 2023, 13 pages.
Russian Office action for 2022111542/11, issued Nov. 24, 2022, in Russian with English translation.
Russian Search Report for 2022111542/11, Completed Nov. 17, 2022, issued with Russian Office action issued Nov. 24, 2022, 11 pages.
Office action from Chinese Patent Application No. 202080072383.7, Dated Feb. 8, 2024, 10 pages.

* cited by examiner

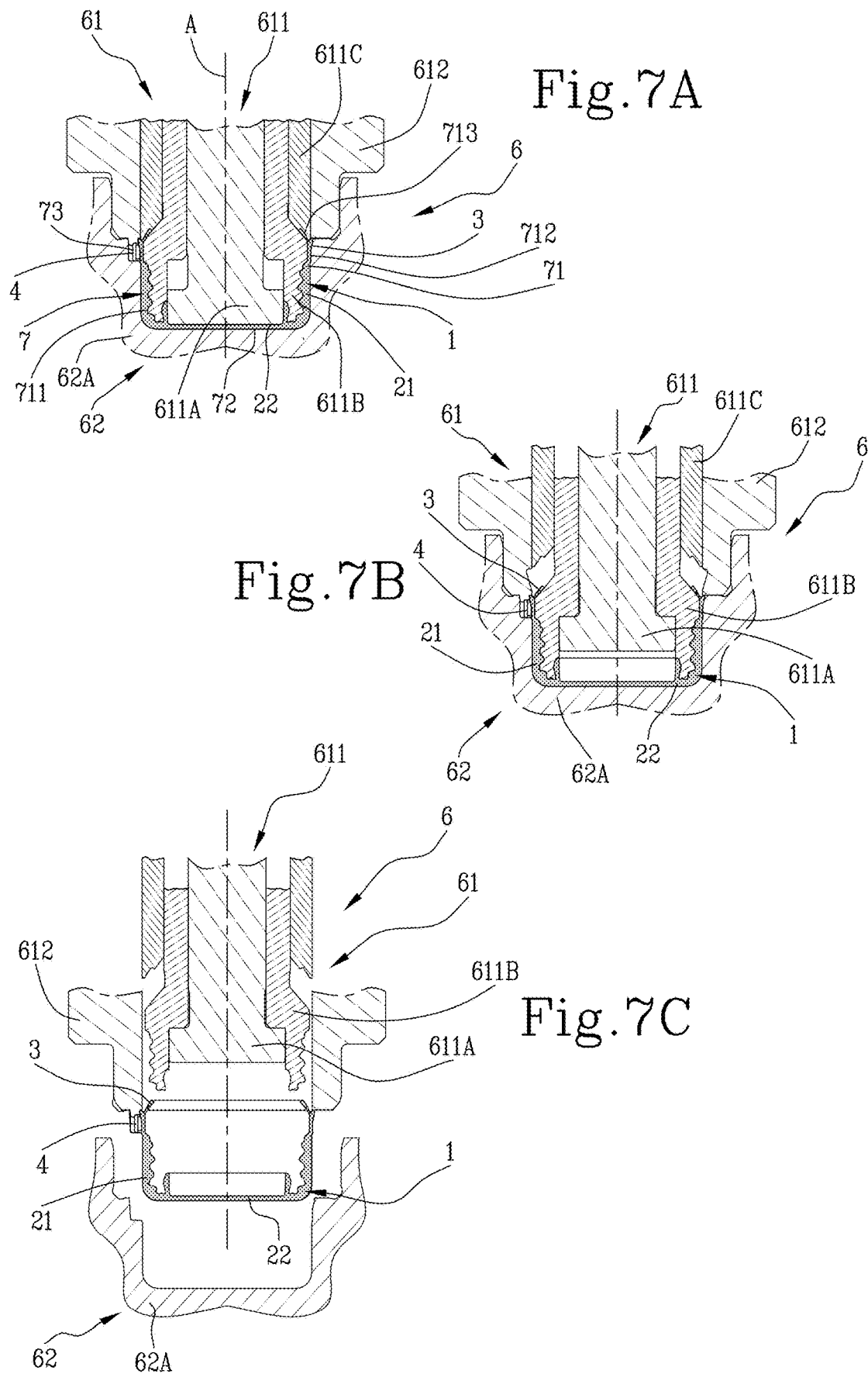

Fig.22A
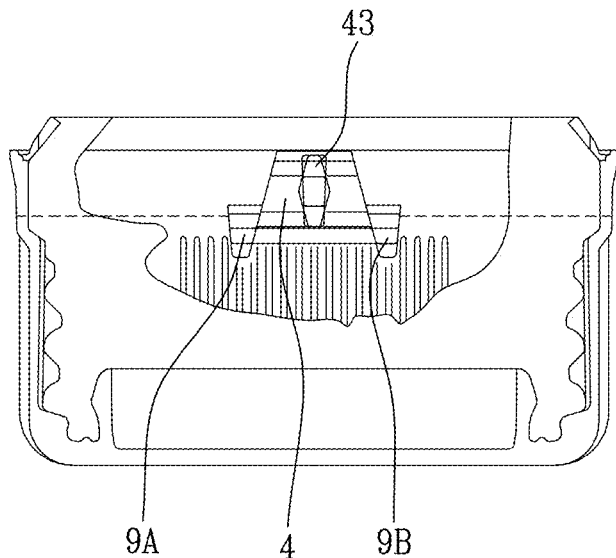
Fig.22B
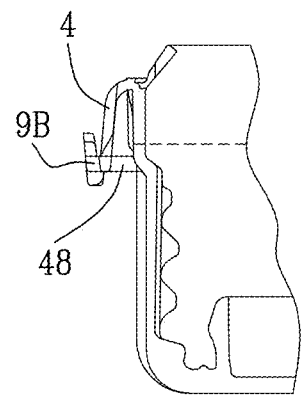
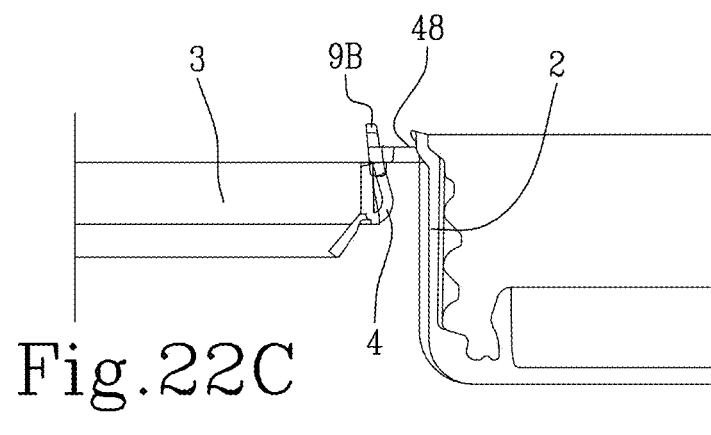
Fig.22C
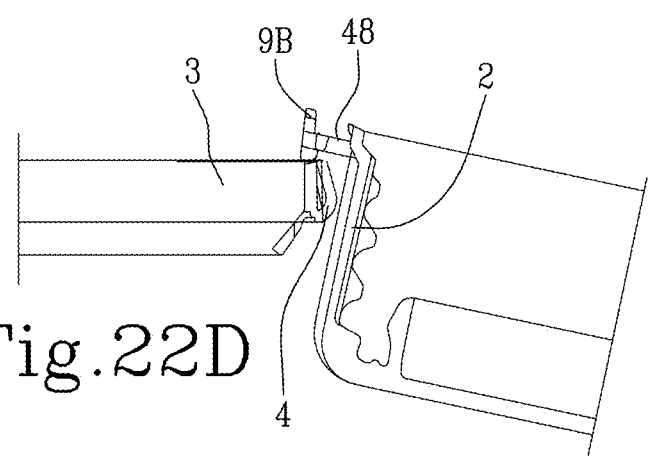
Fig.22D

CAP FOR A CONTAINER

TECHNICAL FIELD

This invention relates to a cap for a container. The invention also relates to a method for making a cap for a container. The invention also relates to a mould for making a cap for a container.

BACKGROUND ART

Conventionally, a container cap comprises a body configured to be coupled and uncoupled relative to the neck of the container and a tamper evident ring configured to remain anchored to the neck of the container even when the body is uncoupled from the neck. The body and the tamper evident ring are joined to each other by a joining portion extending around a longitudinal axis of the cap and including a series of bridges or hinges separated from each other by windows and configured to be tor when the cap is unscrewed for the first time, thereby indicating that the container has been opened. Examples of these caps are described, for example, in patent documents MO2010A000359A1 and MO2010A000360A1. These caps, however, have the disadvantage of allowing the user to discard the cap body into the environment after opening the container, thereby creating a pollution issue.

Also known in the prior art are caps which remain connected to the tamper evident ring: besides the series of bridges intended to be torn when the cap is opened, the joining portion of these caps includes a stable connecting zone where the cap body is permanently connected to the tamper evident ring and remains connected thereto even after opening the cap; in these caps, therefore, the joining portion is not torn along the full perimeter surrounding the longitudinal axis but remains intact in the stable connecting zone. Examples of these caps are described in patent documents US20180370701A1, U.S. Pat. No. 6,474,491B1 and WO2009/002057A2. These caps have several disadvantages: first of all, the stable connecting zone is relatively weak and easy to tear accidentally when the cap is opened; also, when the cap is opened, the body tends to return elastically to a position where it interferes with the neck of the container, thereby making it awkward to pour the liquid out of the container; moreover, moulding the cap is difficult because the plastic material does not always fill the stable connecting zone uniformly.

Also known in the prior art are caps where the cap body, after opening, remains connected to the tamper evident ring by a strip, such as those described in documents JP2005059876A, JP2006143321A, KR100839542B1 and CA2676854A1. In these caps, too, there is the problem that when the cap is opened, the body tends to return elastically to a position where it interferes with the neck of the container, thereby making it awkward to pour the liquid out of the container; moreover, the process of moulding the cap is difficult.

DISCLOSURE OF THE INVENTION

This disclosure has for an aim to provide a cap for a container, as well as a method and a mould for making it to overcome the above mentioned disadvantages of the prior art.

This aim is fully achieved by the cap, method and mould of this disclosure as characterized in the appended claims.

This disclosure relates to a cap for a container. More specifically, this disclosure relates to a plastic cap for containers such as bottles for water and other beverages. This disclosure might, however, also be applicable to caps made of different materials such as metals, for example.

The container includes a body, defining an internal space to contain a product, and a threaded neck.

The cap comprises a body configured to be coupled and uncoupled relative to the neck of the container. The cap body includes a side wall (or skirt) which extends around a longitudinal axis between a first and a second end (the first and the second end extending in a ring around the longitudinal axis). Preferably, the side wall is internally threaded; the cap is thus a screw cap. The cap body includes a transverse wall joined to the first end of the side wall. Preferably, the transverse wall is oriented perpendicularly to the longitudinal axis.

The cap also comprises a tamper evident ring, configured to remain anchored to the neck of the container, even when the body is uncoupled from the neck. The tamper evident ring also extends around the longitudinal axis. The tamper evident ring includes a retaining portion configured to engage a locking member (or annular protrusion) on the neck of the container. The tamper evident ring includes a joining portion, where the tamper evident ring is joined to the cap body. More specifically, the joining portion includes a plurality of bridges or hinges spaced from each other and a plurality of windows alternated with the bridges. The joining portion is configured to be tom along a full perimeter surrounding the longitudinal axis in response to a movement of the body away from the tamper evident ring. It should be noted that the perimeter surrounding the longitudinal axis is preferably circular.

It should be noted that to open the container, the user induces a rotation of the cap (more specifically, a rotation of both the cap body and the tamper evident ring, which are connected to each other at the joining portion); since the side wall of the cap body is internally threaded and coupled to the corresponding thread on the neck of the container, rotating the cap causes it to be displaced along the longitudinal axis (specifically away from the body of the container). The neck of the container includes an abutment member configured to abut against the retaining portion of the tamper evident ring and to stop its displacement along the longitudinal axis (for example, the abutment member may have the shape of an annular portion jutting from a wall of the neck of the container). Thus, when the user induces the rotation of the cap, the cap body and the tamper evident ring are first displaced along the longitudinal axis until the tamper evident ring meets the abutment member; after that, a further rotation of the cap creates tension in the joining zone due to a force, directed along the longitudinal axis, which tends to move the body away from the tamper evident ring. This tension results in tearing of the joining zone (in particular, where present, the bridges of the joining zone are tom). Once the joining zone is torn, the cap body can continue to rotate and to move away from the tamper evident ring until it is free of the thread and uncoupled from the neck of the container, while the tamper evident ring remains coupled to the neck of the container.

The cap also comprises a connecting band, which has a first end connected to the side wall of the body and a second end connected to the retaining portion of the tamper evident ring.

Thus, the cap can be positioned in a first operating configuration, where the retaining portion of the tamper evident ring engages the locking member of the container neck, the cap body is coupled to the container neck and the tamper evident ring is joined to the cap body both by the joining portion of the tamper evident ring and by the connecting band, and in a second operating configuration, where the retaining portion of the tamper evident ring engages the locking member of the container neck, the cap body is uncoupled from the container neck and the tamper evident ring is joined to the cap body by the connecting band but is separated from the cap body at the joining portion which is torn. In particular, the cap is in the first operating configuration before the cap is opened for the first time and in the second operating configuration once the cap has been opened. It should be noted that in the second operating configuration, the joining portion is torn all along its annular profile. The connecting band is outside the joining zone and remains connected both to the cap body and to the tamper evident ring, even when the joining zone is torn. Thus, in the cap according to this disclosure, the function of connecting the cap body to the tamper evident ring to prevent the cap body from polluting the environment and the tamper evidence function indicating that the container has been opened are two distinct functions performed by different parts of the cap: the connecting function is performed by the connecting band and the tamper evidence function by the tamper evident ring. That means the joining zone can be torn completely, allowing the cap body to be moved further from the tamper evident ring than in the prior art solutions, so as not to interfere with the pouring of the liquid. Preferably, in the first operating configuration, the connecting band protrudes from the side wall of the cap body and from the retaining portion of the tamper evident ring, away from the longitudinal axis.

The first end of the connecting band is connected to the side wall of the body in a first connecting zone (defined by the side wall of the body) and the second end of the connecting band is connected to the retaining portion of the tamper evident ring in a second connecting zone (defined by the retaining portion). Preferably, (at least) in the first operating configuration, the length of the connecting band from the first end to the second end is greater than the distance between the first connecting zone and the second connecting zone. Preferably, the connecting band is detached from the joining portion and so forms a slot with the side wall of the body and with the tamper evident ring.

In one or more embodiments, the cap comprises (at least in the first operating configuration) a narrow thickness zone located between the first connecting zone and the second connecting zone. It should be noted that the thickness is defined in a radial direction of the cap. The narrow thickness zone is defined in the side wall of the cap body and/or in the tamper evident ring (in the retaining portion or in the joining portion). Looking in more detail, the narrow thickness zone may be defined in the joining zone (hence, one or more of the bridges will have a smaller radial thickness than the others). More specifically, relative to the profile of the cap around the longitudinal axis, the narrow thickness zone is confined within a limited angular portion, at the connecting band (that is, in front of the connecting band). Thus, in the cap (that is, in the side wall of the cap body and/or in the tamper evident ring), there is a ring having a first thickness in a portion located in proximity to the connecting band (defining the narrow thickness zone) and a second thickness in a portion distant from the connecting band, where the first thickness is smaller than the second thickness. The narrow thickness zone in front of the connecting band is useful during the step of forming the cap: in effect, the narrow thickness zone is formed by a constriction in the mould to facilitate flow of the material into the connecting band. The narrow thickness zone may be just a few hundredths of a millimetre thick (the thickness of a film). The narrow thickness zone preferably has an angular extension greater than each window of the plurality of windows of the joining zone.

The narrow thickness zone might include an opening (whose angular extension is greater than each window). Thus, in a limit case, the narrow thickness zone might be a zero thickness zone. The narrow thickness zone (specifically the opening) may have different shapes (for example, rhomboidal, rectangular, circular, semi-circular or oval). In an embodiment, the connecting band is shaped like a ribbon having a double curvature. More specifically, the connecting band is curved about a first curvature axis, orthogonal to the longitudinal axis and about a second curvature axis, parallel to the longitudinal axis. The ribbon might have a hole in it; the hole improves stability of the second operating configuration of the cap. The ribbon might also be internally rounded to facilitate demoulding (in particular of the first and the second transverse element). By way of example, the ribbon may have a width from 6 mm to 8 mm (for example, 7 mm), defined along its profile around the longitudinal axis.

In an embodiment, the connecting band includes a first strip and a second strip so that in the first operating configuration and in the second operating configuration, the cap body is joined to the tamper evident ring both by the first strip and by the second strip. In this embodiment, the connecting band also includes a first bracket (and preferably a second bracket) jutting from the side wall of the body away from the longitudinal axis, and a third bracket, jutting from the retaining portion of the tamper evident ring away from the longitudinal axis. Thus, it should be noted that the first bracket (and, if present, the second bracket) are located at a first level along the longitudinal axis, whilst the third bracket is located at a second level along the longitudinal axis, different from the first level.

Preferably, along the profile of the cap around the longitudinal axis, the first bracket, the second bracket and the third bracket are angularly offset from each other and the third bracket is interposed between the first bracket and the second bracket. The first strip has a first end which is connected to the first bracket and a second end which is connected to the third bracket. The second strip has a first end which is connected to the second bracket and a second end which is connected to the third bracket. It should therefore be noted that in this embodiment, the first end of the connecting band (connected to the side wall of the cap body) is defined by the first bracket and the second bracket, whilst the second end (connected to the tamper evident ring) is defined by the third bracket.

It should be noted that the fact that there are two brackets connected to the body and a central one connected to the tamper evident ring is useful for filling the mould (which usually starts from the transverse wall of the body towards the tamper evident ring: thus, the plastic material flows up the side wall of the body and fills first the brackets connected to the body, then the strips and, lastly, the bracket connected to the tamper evident ring). Nonetheless, in a possible embodiment, there might be two brackets connected to the tamper evident ring and a central bracket connected to the body.

In an embodiment, the connecting band comprises a strap and a bracket, where the bracket protrudes from the side wall of the body, away from the longitudinal axis; the strap is connected, at a first end of it, to the bracket and, at a second of it, to the tamper evident ring. The bracket extends perpendicularly to the longitudinal axis.

In an embodiment, the connecting band comprises at least one boss. The boss extends from one of the aforesaid brackets. More specifically, in the case where the connecting band comprises a first, a second and a third bracket, the boss extends from one between the first, the second and the third bracket. In the case where the connecting band comprises a bracket connected to the strap, the boss juts out from that bracket. The boss extends predominantly in parallel with the longitudinal axis. The boss is spaced from the body and/or from the tamper evident ring.

In an embodiment, the boss extends from a surface of a bracket (specifically, of the first, the second or the third bracket) jutting from the tamper evident ring and facing towards the transverse wall of the body and is configured to interact (that is, to come into contact) with the side wall of the body in an open configuration of the cap (where the body is spaced from the tamper evident ring).

In an embodiment, the boss extends from a surface of a bracket (specifically, of the first, the second or the third bracket) jutting from the side wall of the body and facing towards the tamper evident ring and is configured to lock together with a portion of the connecting band in an open configuration of the cap.

More specifically, in an embodiment in which the first and the second bracket jut out from the retaining portion of the tamper evident ring and the third bracket juts out from the side wall of the body, a third strip, with a first end connected to the first bracket and a second end connected to the second bracket, is provided; in this embodiment, there is also a boss which extends from the third bracket in parallel with the longitudinal axis away from the tamper evident ring, where the boss is configured to lock together with the third strip in an open configuration of the cap.

In another embodiment, where the first bracket and the second bracket jut out from the side wall of the body and the third bracket juts out from the retaining portion of the tamper evident ring, the third bracket includes side wings which are spaced from the tamper evident ring; this embodiment comprises a first and a second boss which extend from the first and the second bracket towards the side wall of the body and which are configured to lock together with the side wings of the third bracket in the open configuration of the cap.

In an embodiment, the boss extends from a surface of one between the first, the second and the third bracket jutting from the side wall and facing towards the tamper evident ring and is configured to interact with the neck of the container in an open configuration of the cap.

In an embodiment, the third bracket includes a central portion joined to the tamper evident ring (or to the side wall of the body) and a first and a second wing which extend from the central portion away from each other as far as respective ends. The second end of the first strip and the second end of the second strip are connected to the end of the first wing and of the second wing, respectively. In this embodiment, therefore, the third bracket has the shape of a moustache whose ends are connected to the strips. This embodiment gives the connecting band good flexibility when the cap is being opened.

In an embodiment, the cap comprises: a plurality of joining brackets jutting from the retaining portion of the tamper evident ring away from the longitudinal axis; a plurality of additional joining brackets jutting from the side wall of the body away from the longitudinal axis; preferably, the joining brackets and the additional joining brackets are provided along a full circumferential extension all around the longitudinal axis (except for a circular arc portion occupied by the connecting band). The cap also comprises a plurality of joining strips, each having a first end which is connected to a joining bracket of the plurality and a second end which is connected to an additional joining bracket of the plurality; more specifically, each joining bracket is connected to a pair of strips which are in turn connected to a pair of additional joining brackets. The joining strips are configured to be torn in response to a movement of the body away from the tamper evident ring; the joining strips therefore define the joining portion of the tamper evident ring. It should be noted that the joining brackets and the joining strips might themselves define the connecting bridges between the tamper evident ring and the cap (that is, the joining portion); in effect, the cap might be made with an uninterrupted cut on the inside: that is, with a cutter located inside the space inside cap and configured to score the wall between the tamper evident ring and the cap; the cutter does not cut the joining strips which are located at a radially outermost position of the wall. The joining strips and brackets might also be provided in addition to the traditional bridges. It should be noted that the joining brackets, the additional joining brackets and the joining strips might also be provided in a cap that does not have a connecting band; in this case, they would be disposed along the full circumference of the cap, around the longitudinal axis, and would be torn completely when the cap is opened.

The first strip includes a portion extending in a first direction and the second strip includes a portion extending in a second direction. The first direction may coincide with the second direction; in particular, the strips might be parallel to the longitudinal axis (and perpendicular to the brackets). In one or more embodiments, however, the second direction is different from the first direction. More specifically, the first and second directions converge towards the tamper evident ring and diverge towards the cap body. This configuration improves the stability of the cap in the second operating configuration (that is, when it is open) and also facilitates extracting the cap from the mould.

The first and second strips each also include a respective horizontal portion oriented parallel to the first, second and third brackets. More specifically, the first strip may include a first horizontal portion connected, at the first end, to the first bracket and a second horizontal portion connected, at the second end, to the third bracket. Similarly, the second strip may include a first horizontal portion connected, at the first end, to the second bracket and a second horizontal portion connected, at the second end, to the third bracket. Preferably, the horizontal portions are thicker than the brackets (in the axial direction).

The horizontal portions make the connecting band more compliant to torsion; they are also useful to facilitate filling the mould.

The first and the second strip (or rather, the portions of them extending in the first and the second direction, respectively) may have a cross section that has a circular, elliptic, rectangular or other shape.

It should be noted that the first bracket, the second bracket and the third bracket extend outwardly, away from the longitudinal axis. They may extend perpendicularly to the longitudinal axis or obliquely to the longitudinal axis (for example, with an inclination of between 15° and 30° to a horizontal plane perpendicular to the longitudinal axis). More specifically, in an embodiment, the first bracket and the second bracket are inclined to the longitudinal axis towards the third bracket; in addition or alternatively, the third bracket is inclined to the longitudinal axis towards the first bracket and the second bracket.

It should be noted that, as described below, the connecting band, in the embodiment in which it comprises brackets and strips, may be made using a mould having components which are movable only along the longitudinal axis (without necessitating transverse elements). In this case, too, however, the mould may be equipped with elements that are movable transversely and/or elements that are movable radially, in order to facilitate demoulding the connecting band.

The cap may be formed as a single part by injection or compression moulding. In this case, body, tamper evident ring and connecting band include (in particular are moulded from) a single material, preferably plastic.

Alternatively, the body and the tamper evident ring may be formed first, by injection or compression moulding, and the connecting band after them, by overmoulding. Overmoulding may be carried out by injection or injection-compression moulding. In this case, the body and the tamper evident ring include (in particular are moulded from) a first material (preferably plastic) and the connecting band includes (in particular is moulded from) a second material (preferably plastic) different from the first material. Preferably, the second material of the connecting band is more elastic than the first material so it is more easily deformable during opening. For example, the first material might be (or include) polyethylene. The second material might be (or include) polypropylene. The second material might be (or include) a non-polyolefin (PP/PE) such as, for example, a food safe silicone rubber. The second material might be (or include) a resin.

The side wall includes an internal thread which extends between a starting end and a finishing end, where the starting end is the one closer to the tamper evident ring and the finishing end is the one closer to the transverse wall. Along the profile of the cap extending around the longitudinal axis, the starting end of the internal thread has a first angular position and the connecting band has a second angular position. It should be noted that in actual fact, the connecting band extends between a respective initial angular position and a respective final angular position; for simplicity, by "second angular position" of the connecting band is meant the intermediate angular position, between the initial position and the final position.

The connecting band has a predetermined angular position relative to the starting end of the internal thread.

In an embodiment, the first angular position (of the starting end of the thread) is (approximately) in phase with the second angular position (of the connecting band); in particular, the first and the second angular position are out of phase by an angle between +20° and −20° (preferably, between +10° and −10°). That way, during opening of the cap after tearing the joining zone, the last angular portion of the cap body that remains attached to the neck of the container is that where the connecting band is, whilst the part diametrically opposite it is the first to be detached. This feature allows making a connecting band that is shorter in length than solutions in which the connecting band is not in phase with the starting end of the thread.

In another embodiment, the first angular position (of the starting end of the thread) is out of phase with the second angular position (of the connecting band) by an angle between 80° and 190° (in particular, between 90° and 180°).

It should be noted that the above applies not only to a case where the internal thread has a single thread start but also to a case where the internal thread has a plurality of thread starts (specifically, two or three thread starts).

It should be noted that when the cap is being opened, the connecting band is subjected to mechanical stresses to pass from the first to the second operating configuration. In one or more embodiments, the connecting band includes a material which is configured to change colour when subjected to mechanical stresses. For example, the connecting band may be covered with a film that changes colour when subjected to mechanical stresses and/or the connecting band includes a vessel containing a coloured liquid that is released when the connecting band is subjected to mechanical stresses. That way, the connecting band can provide evidence that the cap (or rather, the container) has already been opened for the first time.

Although we have referred to a cap in which the joining zone is torn completely during opening, it should be noted that the connecting band according to one or more aspects of this disclosure also advantageously applies to caps in which a portion of the joining zone remains intact even after opening (as, for example, the cap disclosed in Italian patent application 102019000012585 in the name of this Applicant).

This disclosure also relates to a method for making a cap for a container. The cap is preferably a cap according to one or more aspects of this disclosure.

The method comprises a step of forming. Made in the step of forming is a body of the cap, configured to be coupled and uncoupled relative to the neck of the container; the cap body includes a side wall which is internally threaded and extends around a longitudinal axis between a first and a second end. The cap body also includes a transverse wall joined to the first end of the side wall. Also made in the step of forming is a tamper evident ring, configured to remain anchored to the neck of the container, even when the body is uncoupled from the neck. The tamper evident ring includes a retaining portion, configured to engage a locking member on the neck of the container, and a joining portion, where the tamper evident ring is joined to the cap body; the joining portion being configured to be torn along a full perimeter surrounding the longitudinal axis in response to a movement of the body away from the tamper evident ring.

Also made in the step of forming is a connecting band, which has a first end connected to the side wall of the body and a second end connected to the retaining portion of the tamper evident ring. The tamper evident ring is thus joined to the cap body both by the joining portion of the tamper evident ring and by the connecting band.

In an embodiment, the step of forming is carried out entirely by (injection or compression) moulding; hence, the connecting band is made as one with the body and tamper evident ring during (injection or compression) moulding.

In an embodiment, the step of forming includes a sub-step of (injection or compression) moulding), in which the body and the tamper evident ring are formed, and a sub-step of overmoulding, following the step of moulding, in which the connecting band is made. In this embodiment, moulding comprises making at least a first hole in the side wall of the body and a second hole in the retaining portion of the tamper evident ring. Next, in the step of overmoulding, the connecting band is made, with the first end thereof being inserted (locked) in the first hole and the second end thereof being inserted (locked) in the second hole. More specifically, the holes each have at least one portion where the cross section is convergent away from the longitudinal axis in such a way as to retain the respective ends of the connecting band. The method may also comprise a step of engraving (or incising) the joining zone, after the step of forming, in order to make a zone of weakness (specifically to make a plurality of windows) configured to facilitate tearing the joining zone in response to a movement of the body away from the tamper evident ring. Engraving is carried out with a cutting device which may be configured to cut the joining zone from the inside or the outside of the cap. Preferably, engraving is carried out from the inside (that is, with a cutting device placed in the internal space delimited by the side wall of the cap body) so as not to interfere with the connecting band.

In other embodiments, the zone of weakness is made during moulding (for example, in injection moulding, windows and bridges can be made using a specifically shaped mould).

This disclosure also relates to a mould for making a cap. The cap is preferably a cap according to one or more aspects of this disclosure.

The mould is movable between an open configuration and a closed configuration. In the closed configuration, the mould defines a forming cavity. In the open configuration, the mould is configured to allow extracting the cap.

The forming cavity includes a side hollow. The side hollow includes a body zone that is internally threaded and extends around a longitudinal axis between a first and a second end. The side hollow includes a joining zone that extends around the longitudinal axis and is connected to the second end of the body zone. The side hollow includes a tamper evidence zone that extends around the longitudinal axis and is connected to the joining zone. The joining zone is thus interposed between the body zone and the tamper evidence zone. The joining zone defines a first passage between the body zone and the tamper evidence zone. The body zone is configured to form the side wall of the body of the cap; the joining zone is configured to form the joining portion of the tamper evident ring; the tamper evidence zone is configured to form the retaining portion of the tamper evident ring.

The forming cavity includes a transverse hollow, connected to the first end of the body zone of the side hollow. The transverse hollow is configured to form the transverse wall of the body of the cap.

The forming cavity also includes a bypass hollow. The bypass hollow has a first end in (fluid) communication with the body zone of the side hollow and a second end in (fluid) communication with the tamper evidence zone of the side hollow. The bypass hollow thus defines a second passage between the body zone and the tamper evidence zone, distinct from the first passage. The bypass hollow is configured to form the connecting band of the cap. It should be noted that the mould is filled in parallel through the first and the second passage: in effect, the bypass hollow and the side hollow define parallel passages (or channels).

The bypass hollow is situated on the outside of the perimeter of the joining zone surrounding the longitudinal axis. The bypass hollow has a smaller angular extension around the longitudinal axis than the perimeter (meaning that it is confined within a limited angular zone—that is to say, it does not extend all the way round the longitudinal axis).

In one or more embodiments, the side hollow defines a constriction located between the first end of the bypass hollow (that is, the zone where the first end is connected to the body zone) and the second end of the bypass hollow (that is, the zone where the second end is connected to the tamper evidence zone). The constriction is configured to form the narrow thickness zone of the cap. The constriction is defined by a passage with a reduced (or zero) cross section. The constriction may be located in the body zone, in the joining zone or in the tamper evidence zone. The constriction is confined within a limited angular portion, at the bypass hollow.

The mould comprises an upper unit and a lower unit, movable relative to each other along the longitudinal axis between a spaced-apart position, to define the open configuration of the mould, and a close-together position, to define the closed configuration of the mould.

The lower unit and the upper unit are shape matched to define, in the closed configuration of the mould, an (annular) contact surface. The contact surface includes a (first) portion which lies in a closing plane. The contact surface also includes two or more portions which are inclined to the closing plane. The contact surface may also include at least one planar portion which lies in a plane parallel to the closing plane and which connects to each other the two portions that are inclined to the closing plane.

The lower unit thus defines one or more spaces extending away from the upper unit and the upper unit defines one or more protuberances jutting from the closing plane and configured, in the closed configuration of the mould, to penetrate the one or more spaces of the lower unit to delimit the bypass hollow.

It should be noted that the protuberances and the spaces of the lower unit have recesses made in them (for example by removal of material) to delimit the bypass hollow in which the connecting band is formed.

More specifically, the bypass hollow preferably includes: a first bracket hollow and a second bracket hollow, in communication with the body zone and jutting out from the body zone; a third bracket hollow, in communication with the tamper evidence zone and jutting out from the tamper evidence zone; a first strip hollow, extending between a first end in communication with the first bracket hollow and a second end in communication with the third bracket hollow; a second strip hollow, extending between a first end in communication with the second bracket hollow and a second end in communication with the third bracket hollow. It should be noted that along the profile of the forming cavity around the longitudinal axis, the first bracket hollow, the second bracket hollow and the third bracket hollow are angularly offset from each other and the third bracket hollow is interposed between the first bracket hollow and the second bracket hollow. In the close-together position, the one or more protuberances of the upper unit and the one or more spaces of the lower unit delimit the first bracket hollow, second bracket hollow, third bracket hollow, first strip hollow and second strip hollow. More specifically, the inclined portions of the contact surface (that is, the surfaces of the protuberances and spaces) delimit the first and second strip hollows, whilst the planar surfaces parallel to the closing plane delimit the bracket hollows.

It should be noted that in an embodiment, the bypass hollow might be the reverse of what is described above: more specifically, the first bracket hollow and the second bracket hollow might be in communication with the tamper evidence zone and the third bracket hollow in communication with the body zone.

It should be noted that, preferably, the planar surfaces define recesses for forming the brackets and which are shorter in length than the planar surfaces themselves along a profile around the longitudinal axis. That way, it is possible to form brackets with special rounded edges by suitably shaping the recesses.

The upper unit includes a core (that is, a male element) configured to interact with the recess of the lower unit (that is, a female element) to delimit the side hollow and the transverse hollow in the closed configuration of the mould. The upper unit also includes an extractor, surrounding the core and movable along the longitudinal axis relative to the core. More in detail, the extractor and the lower unit are shape matched to define the annular contact surface between upper unit and lower unit and the one or more protuberances are defined in the extractor.

It should be noted that the core may include a lateral edge in an angular zone not covered by the connecting band and a boss protruding radially from the lateral edge in an angular zone covered by the connecting band; the boss forms the constriction of the side hollow. In other words, the core includes a central element, extending symmetrically about the longitudinal axis, and a boss, jutting radially from the central element in a limited angular zone in front of the connecting band hollow.

Preferably, the protuberances and the spaces are trapezoidal in shape. That is to say, the one or more protuberances and the one or more spaces include respective edges that are obliquely inclined to the closing plane. More specifically, the edges are preferably inclined to the closing plane at an angle different from a right angle.

In an embodiment, the upper unit and the lower unit, in the close-together position, delimit the side hollow and the transverse hollow but not the connecting band hollow. In this embodiment, the mould also comprises a first transverse element and a second transverse element, movable relative to each other along a transverse direction, perpendicular to the longitudinal axis, between a working position, where they are in contact with each other, and a rest position, where they are spaced apart. In the open configuration of the mould, the first transverse element and the second transverse element are at the rest position and, in the closed configuration of the mould, the first transverse element and the second transverse element are at the working position and delimit the bypass hollow. More specifically, recesses which delimit the bypass hollow are made at one end of the first transverse element (configured to contact the second transverse element at the close-together position) and/or at one end of the second transverse element (configured to contact the first transverse element at the close together position).

The first and second transverse elements partly delimit the side hollow. It should be noted that in an embodiment, the constriction of the side hollow may be made by suitably shaping the first and second transverse elements, that is, by creating a protrusion in the wall of the first and of the second transverse element that delimits the side hollow.

The first and the second transverse element may have a cross section that has a rectangular, circular, semi-circular, elliptic or other shape.

BRIEF DESCRIPTION OF DRAWINGS

These and other features will become more apparent from the following description of a preferred embodiment, illustrated by way of non-limiting example in the accompanying drawings, in which:

FIGS. 7A, 7B, and 7C are longitudinal cross sections of the cap of FIG. 6 and the mould used to make it, during a sequence of opening the mould;

FIGS. 22A and 22B are, respectively, a front view and a side view of a cap for a container according to a further embodiment of it, in which the connecting band includes a bracket connected to the side wall of the body, a strap connected to the bracket and to the tamper evident ring, and a pair of bosses extending from the bracket;

FIG. 22C shows the cap of FIGS. 22A and 22B in a partly open configuration or while it is being opened;

FIG. 22D shows the cap of FIGS. 22A and 22B in an open configuration in which the boss interacts with the neck of the bottle to stop the cap from returning elastically to a closed configuration.

DETAILED DESCRIPTION OF PREFERRED EMBODIMENTS OF THE INVENTION

Figure 1:
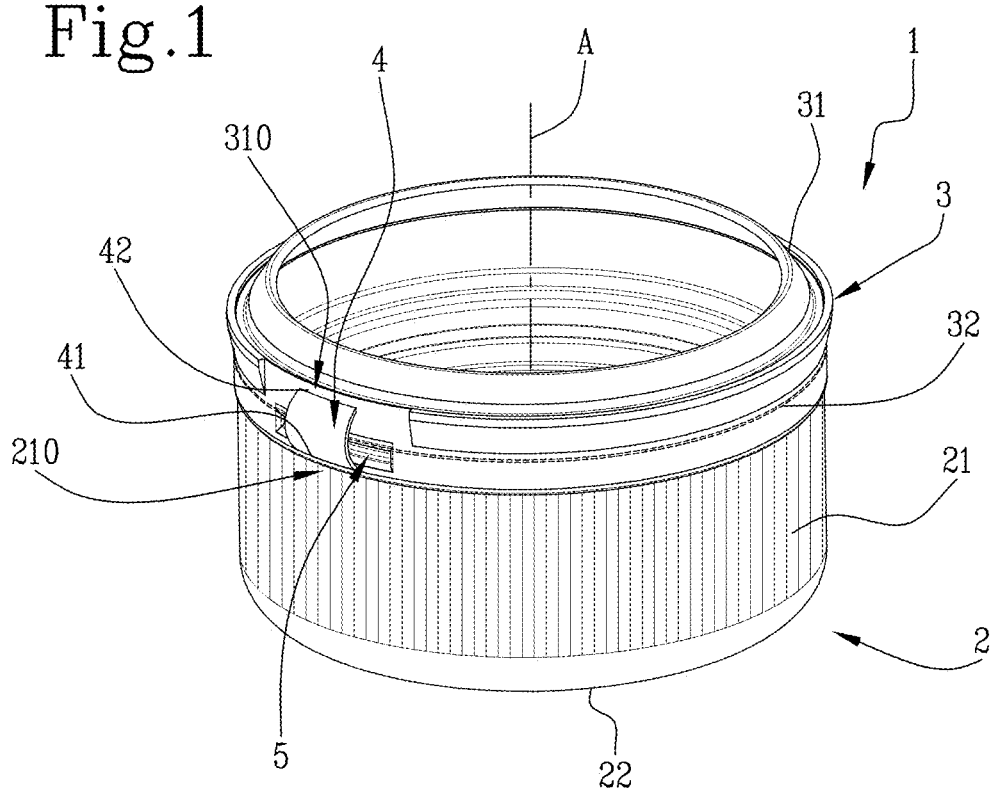
FIG. 1 illustrates a cap for a container according to an embodiment of this disclosure in which it includes a connecting band having the shape of a ribbon with a double curvature.
Figure 1A:
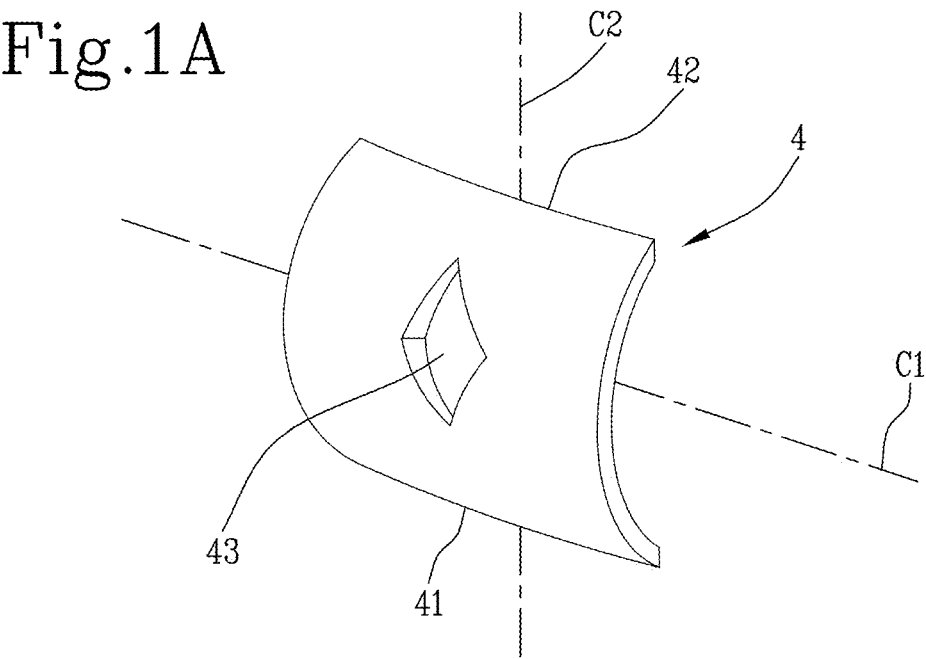
FIG. 1A illustrates a detail of the cap of FIG. 1 in a possible variant embodiment.
Figure 2A:
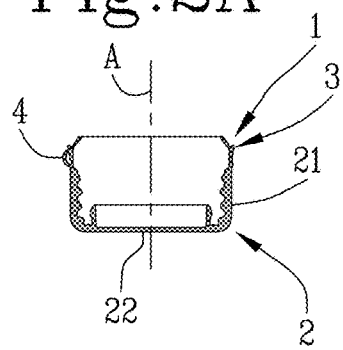
FIG. 2A illustrates the cap of FIG. 1 in a longitudinal cross section.
Figure 2B:
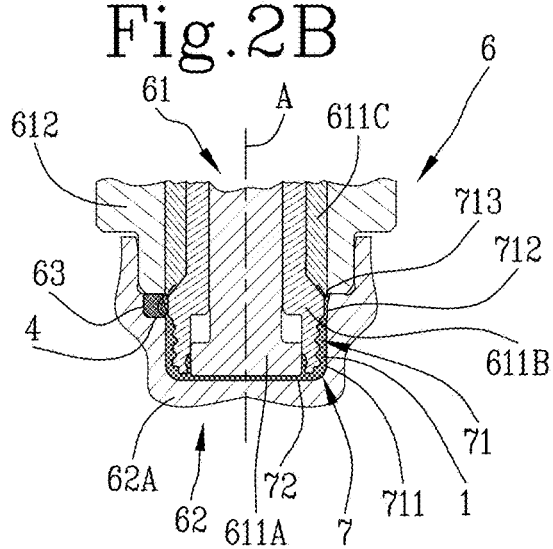
FIGS. 2B, 2C, 2D, 2E and 2F are longitudinal cross sections of the cap of FIG. 1 and the mould used to make it, during a sequence of opening the mould.
Figure 2C:
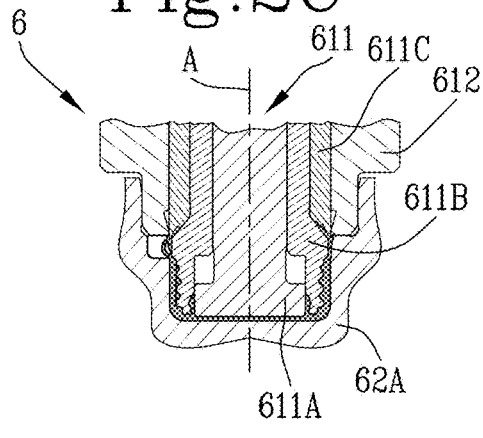
Figure 2D:
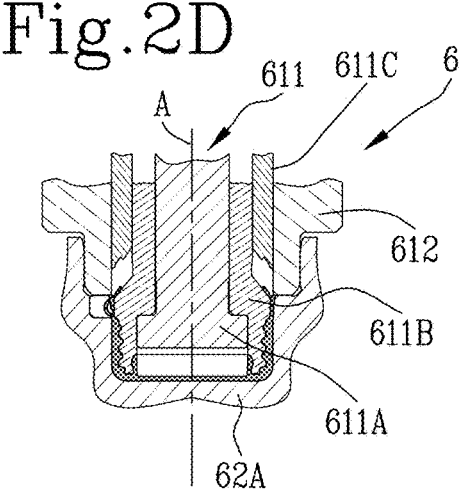
Figure 2E:
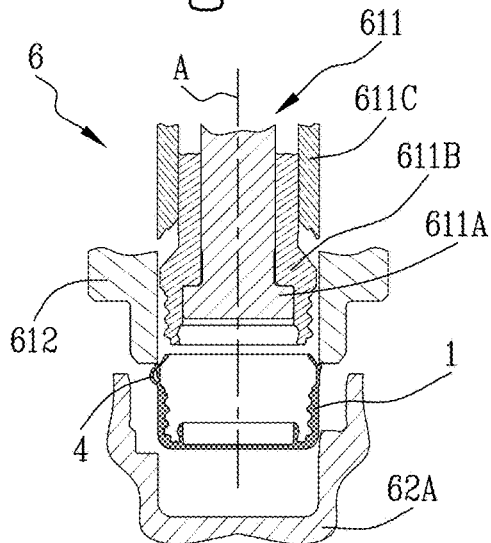
Figure 2F:
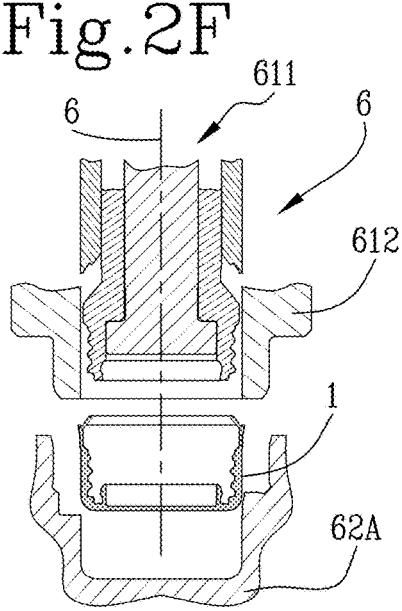
Figure 3A:
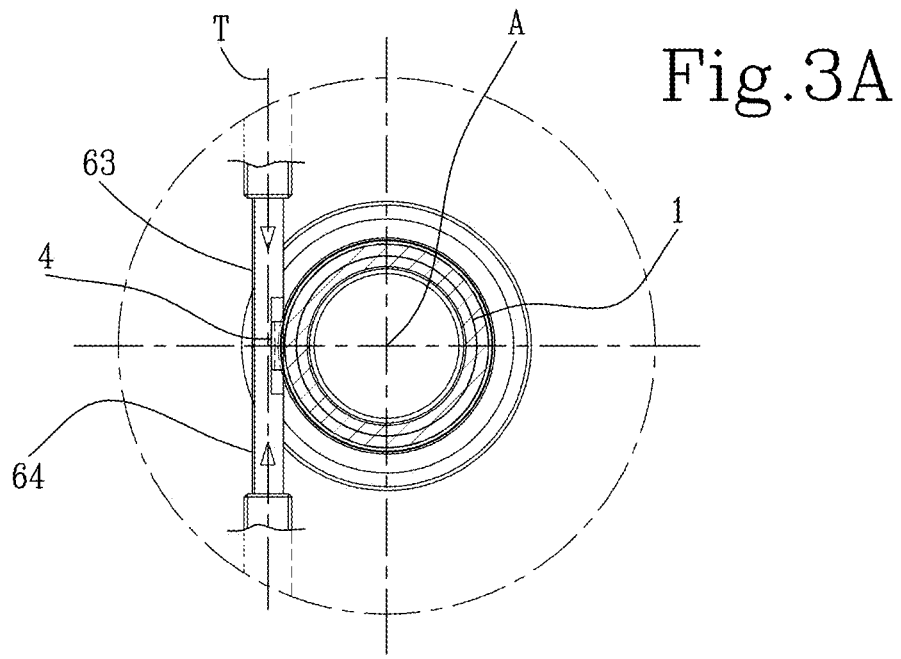
FIGS. 3A and 3B are radial cross sections of the mould for making the cap of FIG. 1 at the positions of FIGS. 2B and 20, respectively.
Figure 3B:
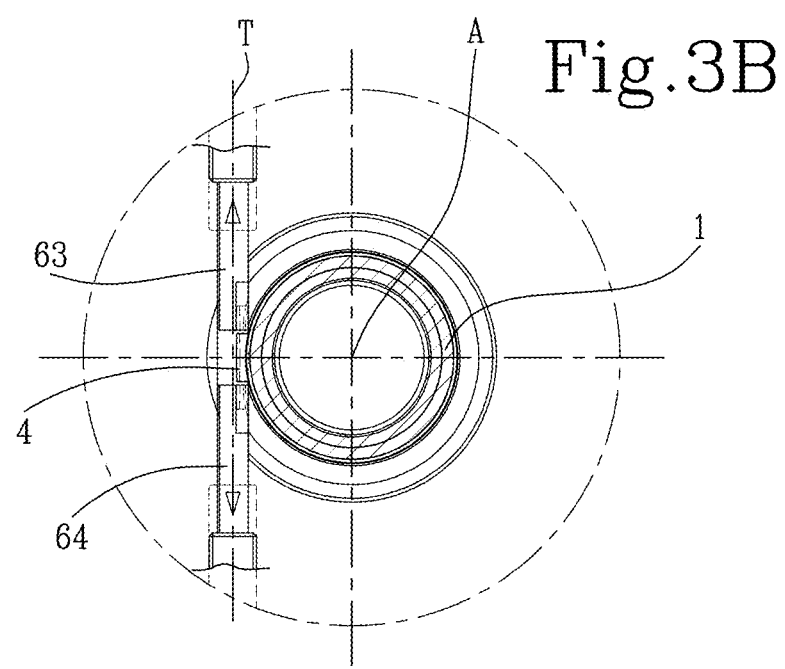
Figure 4A:
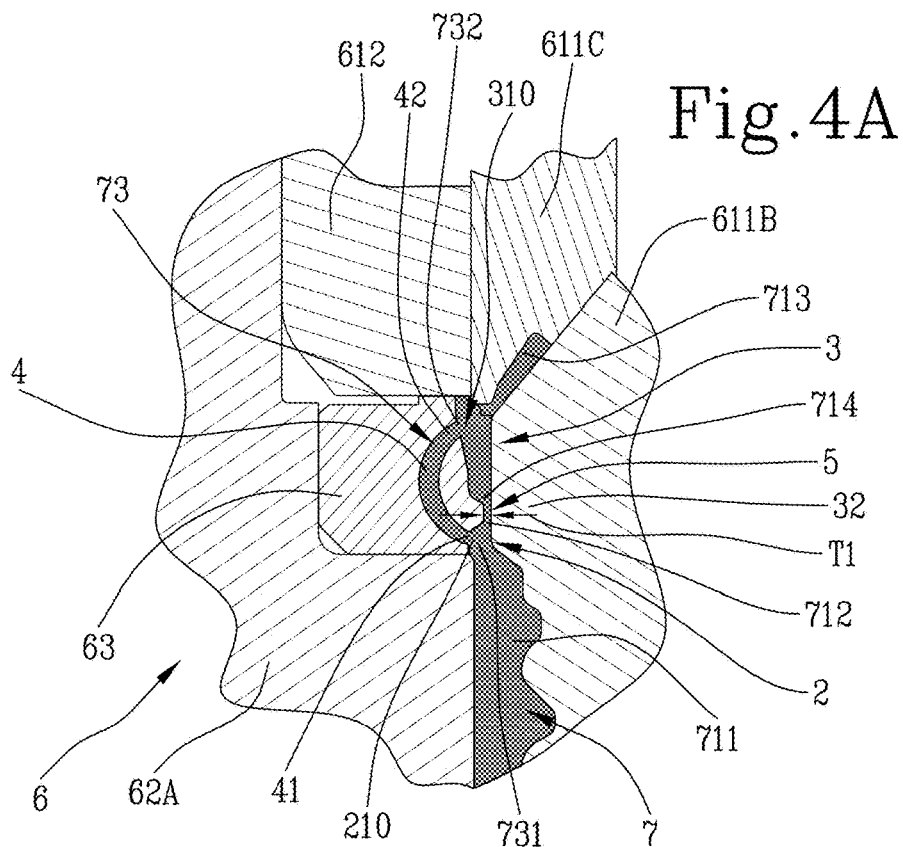
FIG. 4A is a longitudinal cross section of a detail of the cap of FIG. 1 and of the mould used to make it, at the position of FIG. 2A.
Figure 4B:
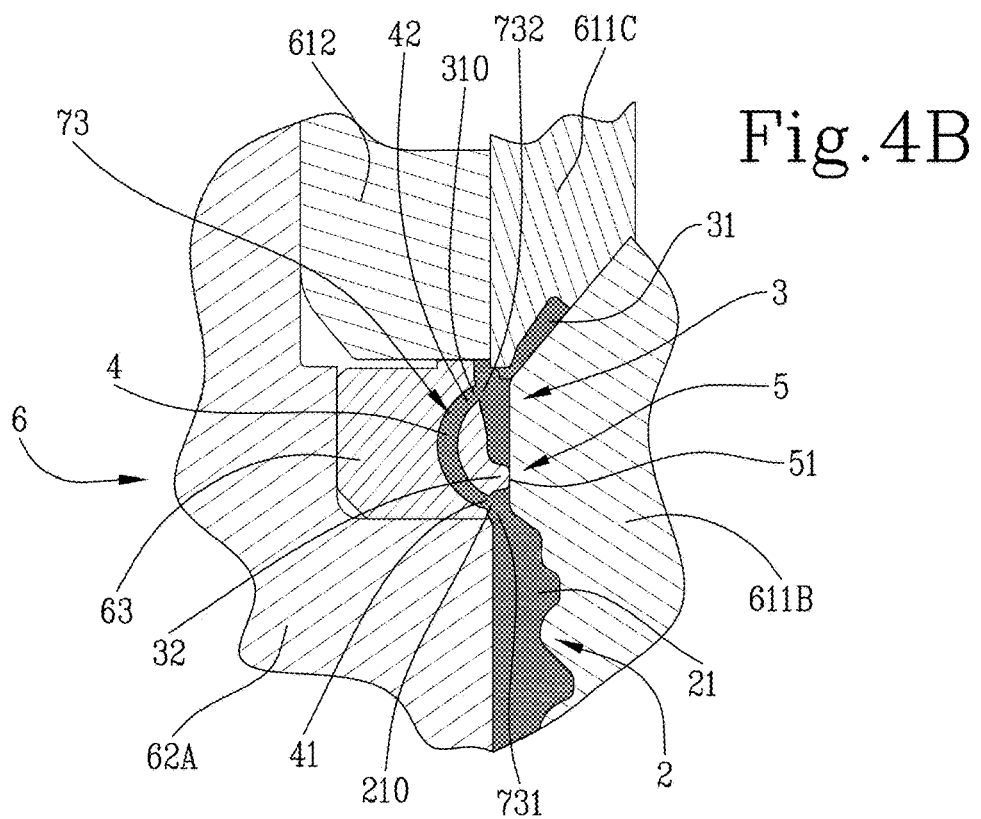
FIG. 4B shows a variant embodiment of the detail of the cap and mould of FIG. 4A, in which the narrow thickness zone includes an opening.
Figure 5A:
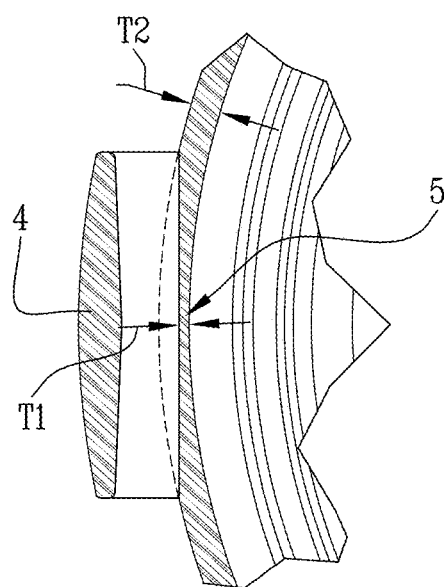
FIGS. 5A and 5B illustrate a detail of the cap of FIGS. 4A and 4B in radial cross sections.
Figure 5B:
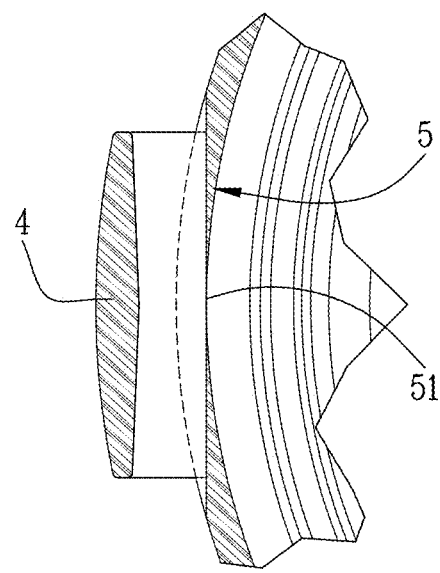
Figure 6:
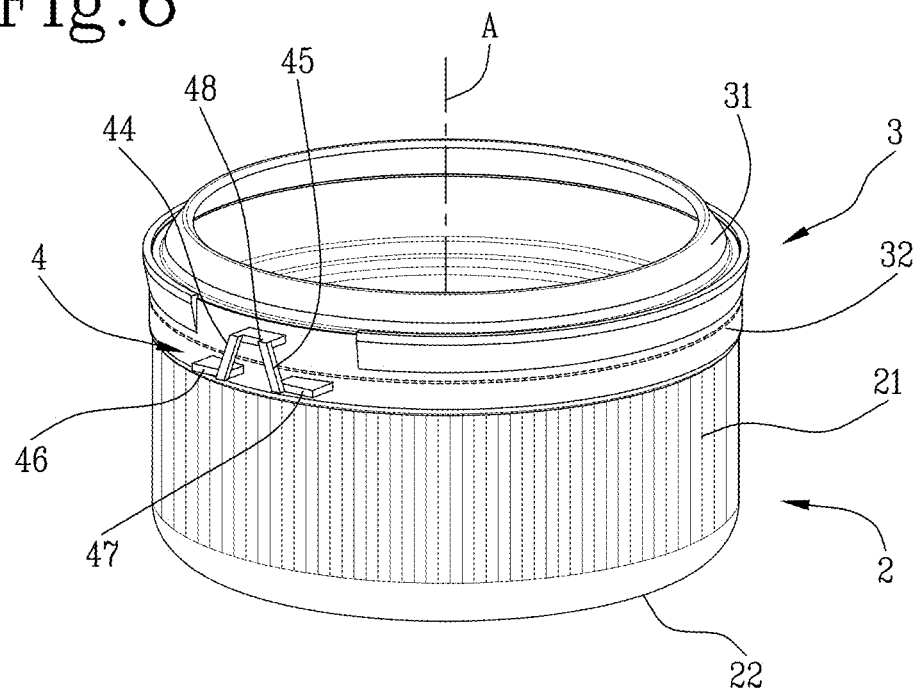
FIG. 6 illustrates a cap for a container according to a further embodiment of this disclosure in which it includes a connecting band including a first and second strip connected to brackets.
Figure 8A:
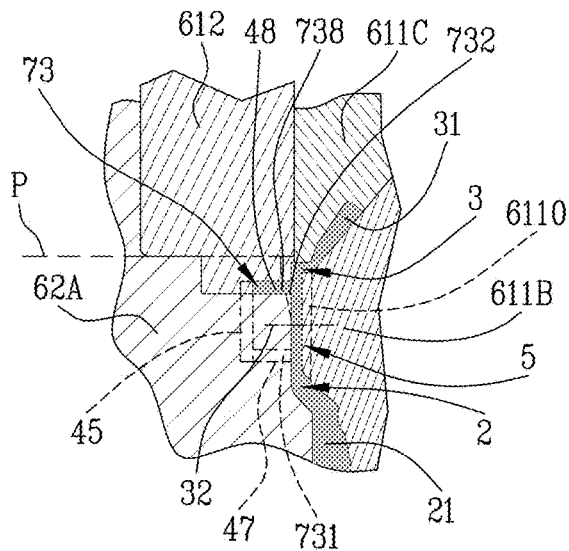
FIG. 8A shows a detail from FIG. 7A.
Figure 8B:
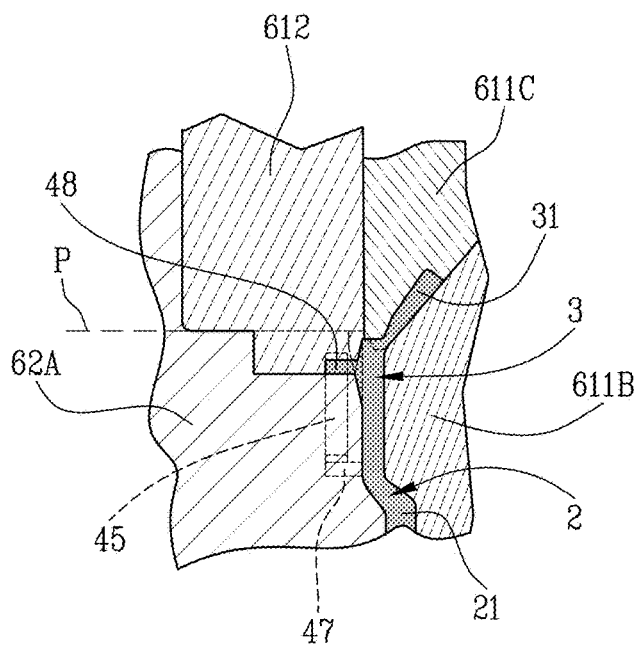
FIGS. 8B, 9B and 10B are views corresponding to those of FIGS. 8A, 9A and 10A, respectively, and show a possible variant embodiment of the cap of FIG. 6.
Figure 8C:
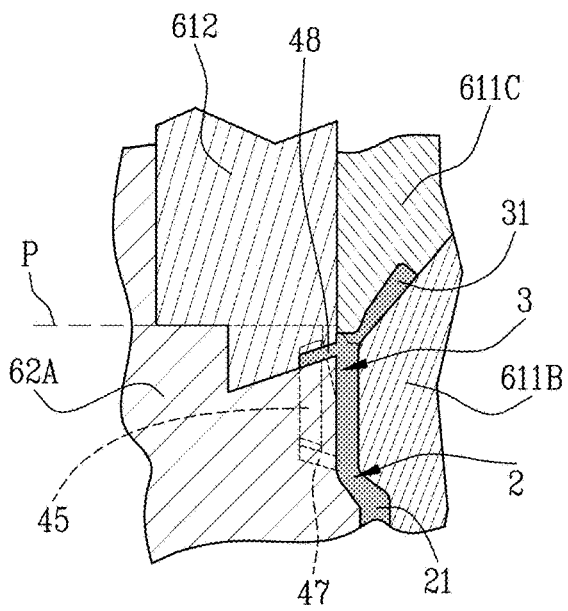
FIG. 8C is a view corresponding to the views of FIGS. 8A and 8B and shows a further variant embodiment of the cap of FIG. 6.
Figure 9A:
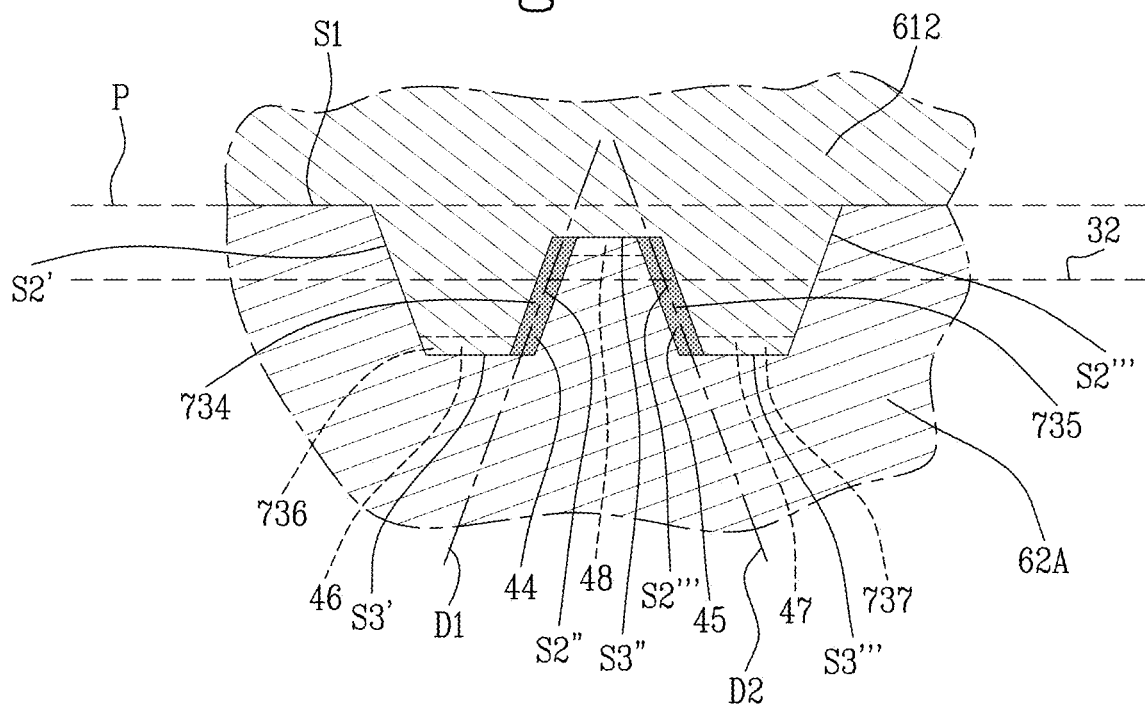
FIG. 9A shows a detail of the cap and mould of FIG. 6 in a longitudinal cross section orthogonal to the longitudinal cross section of FIG. 8A.
Figure 9B:
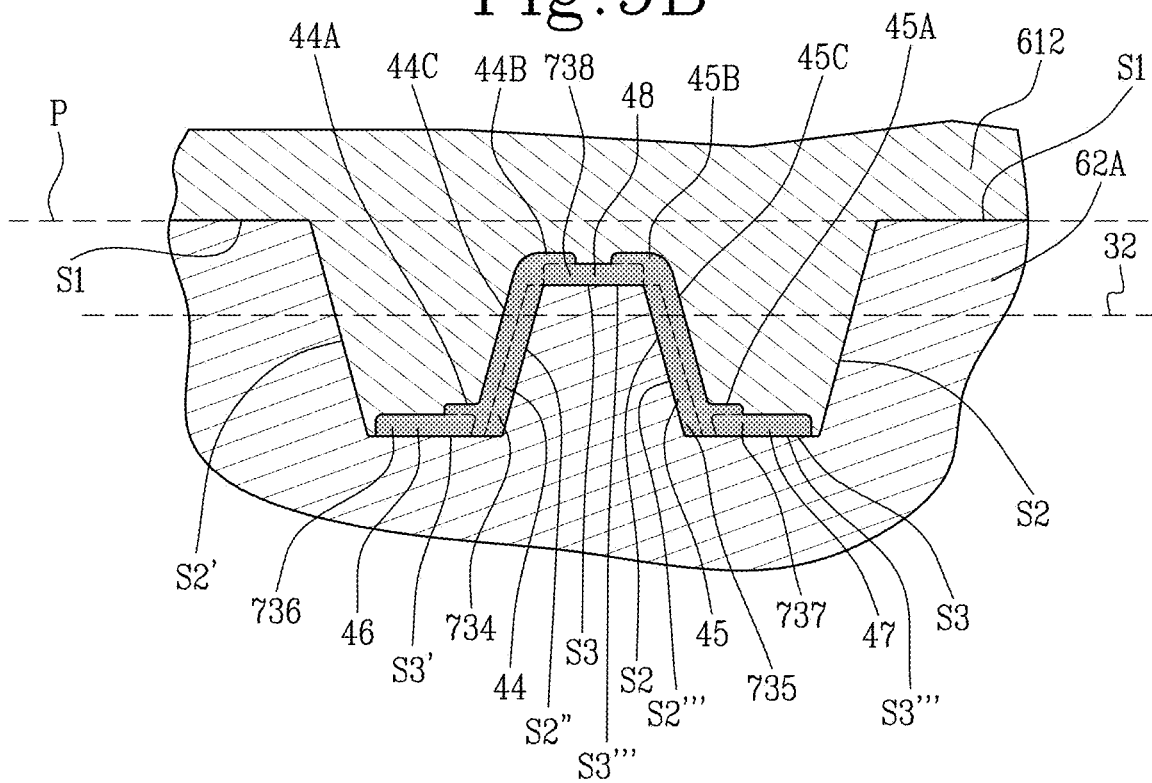
Figure 10A:
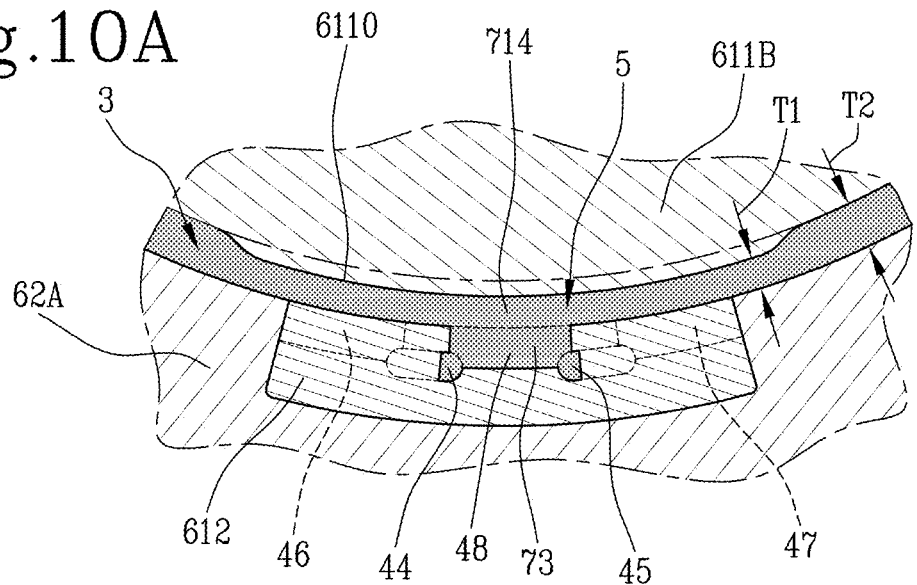
FIG. 10A shows a detail of the cap and mould of FIG. 6 in a horizontal cross section orthogonal to the longitudinal axis of the cap and to the cross sections of FIGS. 8A and 9A.
Figure 10B:
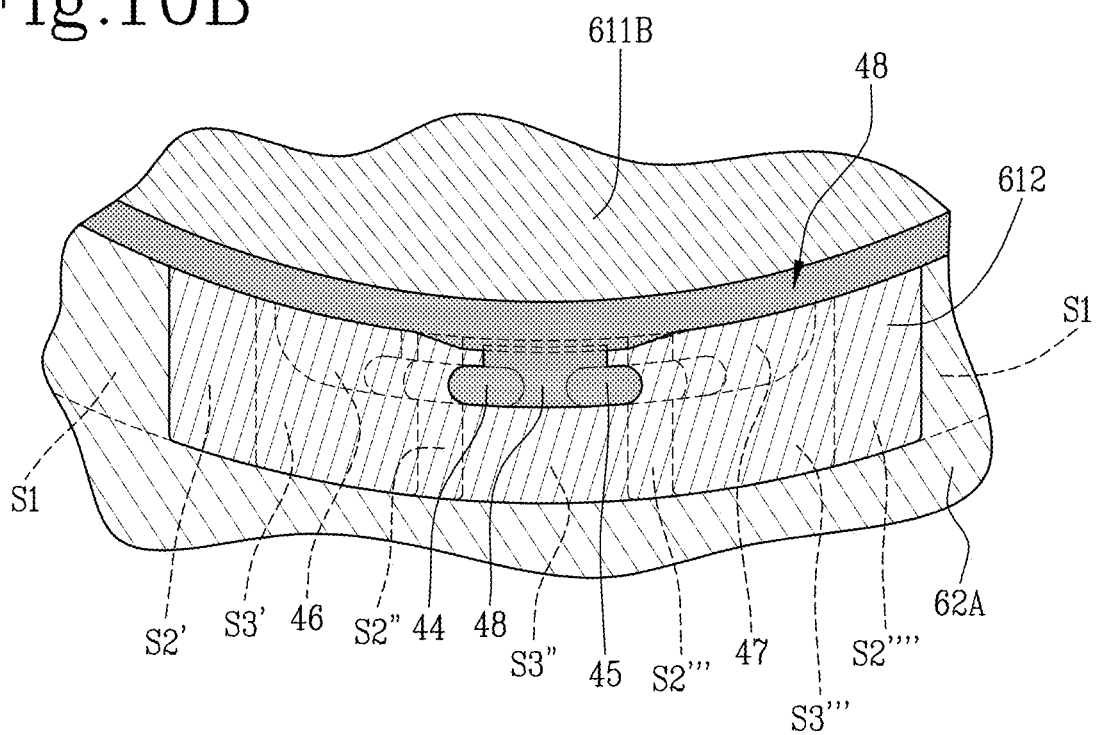
Figure 11A:
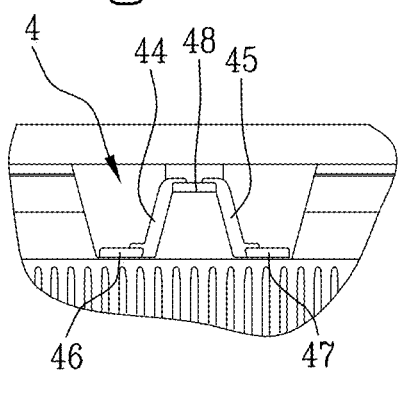
FIGS. 11A and 11B show, respectively, a side view and a top view of the connecting band according to the variant embodiment of FIGS. 88, 9B and 10B, extracted from the mould.
Figure 11B:
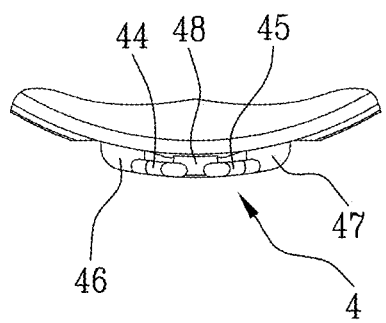
Figure 12A:
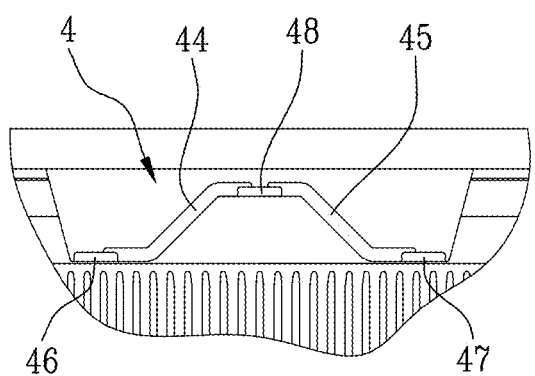
FIGS. 12A and 12B show, respectively, a side view and top view of a further variant embodiment of the cap of FIG. 6.
Figure 12B:
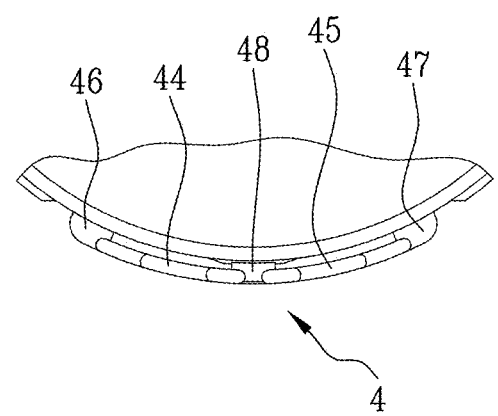
Figure 13A:
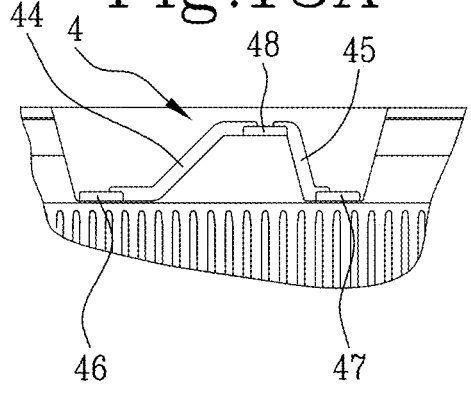
FIGS. 13A and 13B show, respectively, a side view and a top view of a further variant embodiment of the cap of FIG. 6.
Figure 13B:
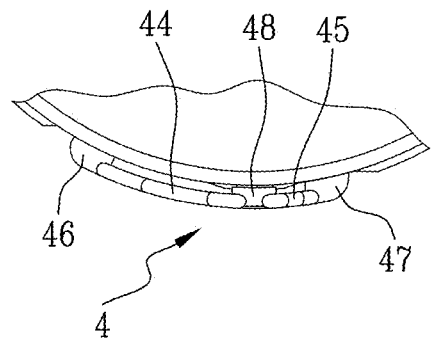
Figure 14:
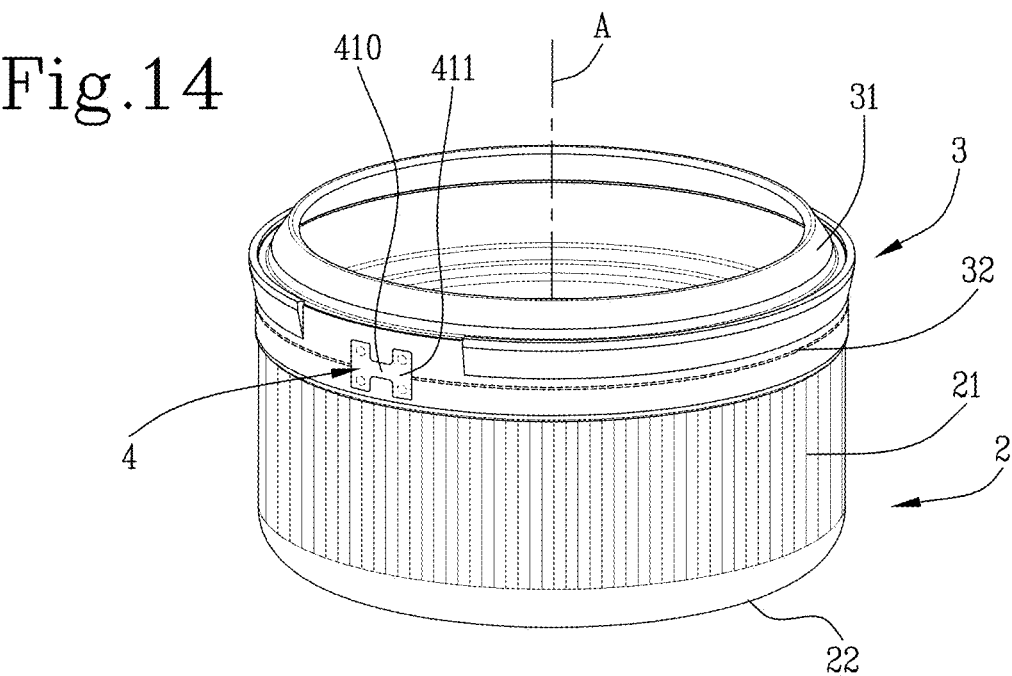
FIG. 14 illustrates a cap for a container according to a further embodiment of this disclosure in which the connecting band is made by overmoulding.
Figure 15A:
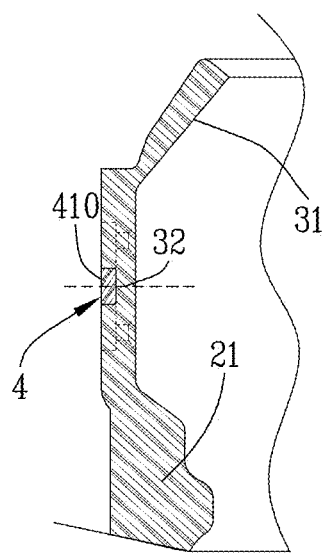
FIG. 15A shows a first longitudinal cross section of the cap of FIG. 12 before opening the first time.
Figure 15B:
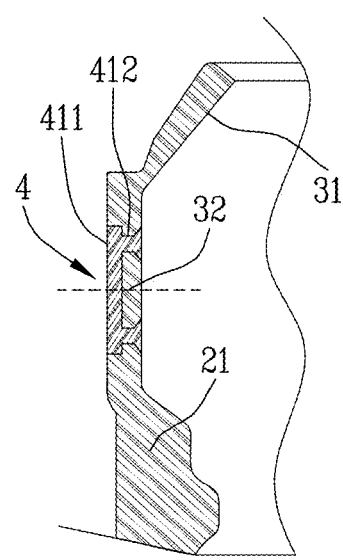
FIG. 15B shows a second longitudinal cross section of the cap of FIG. 12 before opening the first time.
Figure 15C:
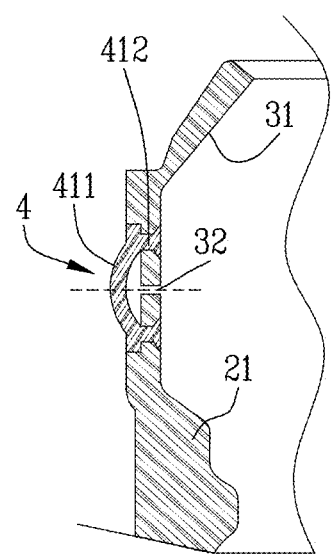
FIG. 15C shows the second longitudinal cross section of the cap of FIG. 14 (that is, the same cross section as FIG. 15B) after opening the first time.
Figure 16:
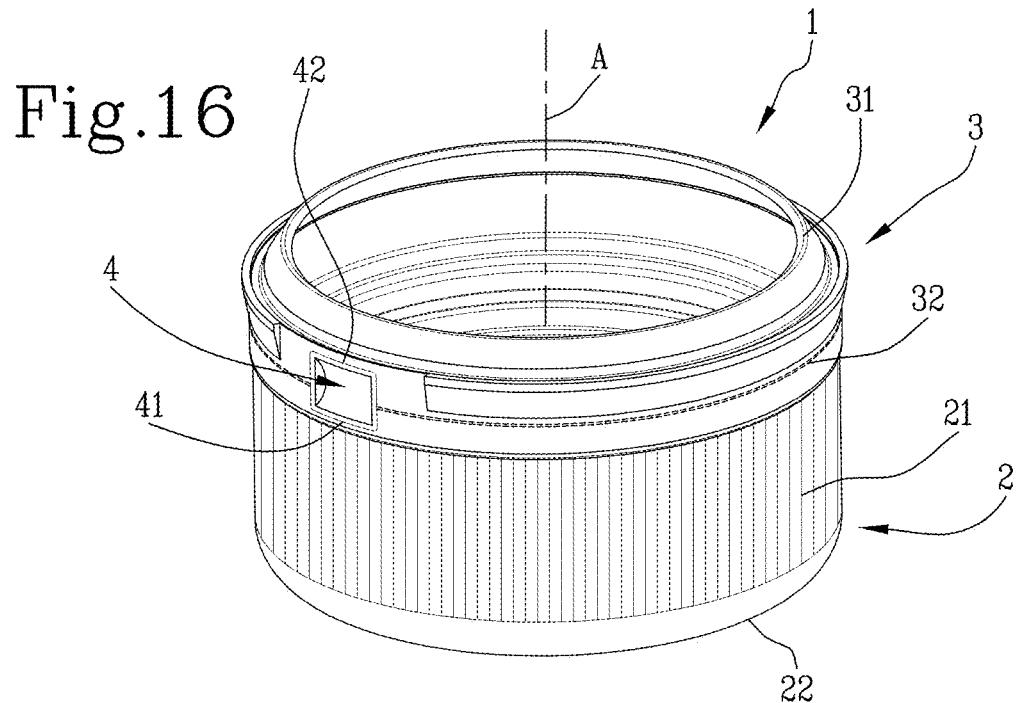
FIG. 16 illustrates a cap for a container according to a further embodiment of this disclosure in which the connecting band is made by overmoulding.
Figures 16A, 16B:
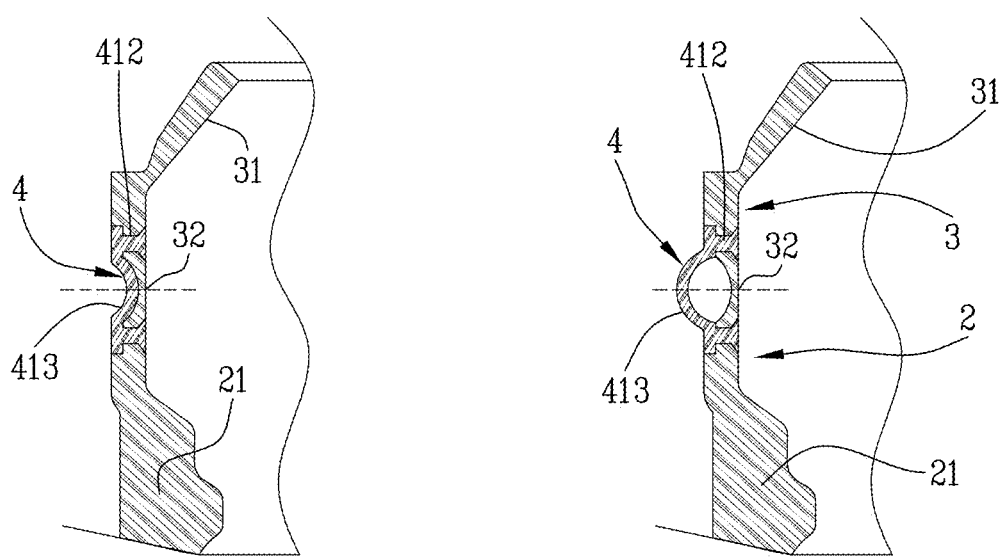
FIG. 16A shows a longitudinal cross section of the cap of FIG. 14 before opening the first time.
FIG. 16B shows the longitudinal cross section of the cap of FIG. 14 (that is, the same cross section as FIG. 17A) after opening the first time.
Figure 17A:
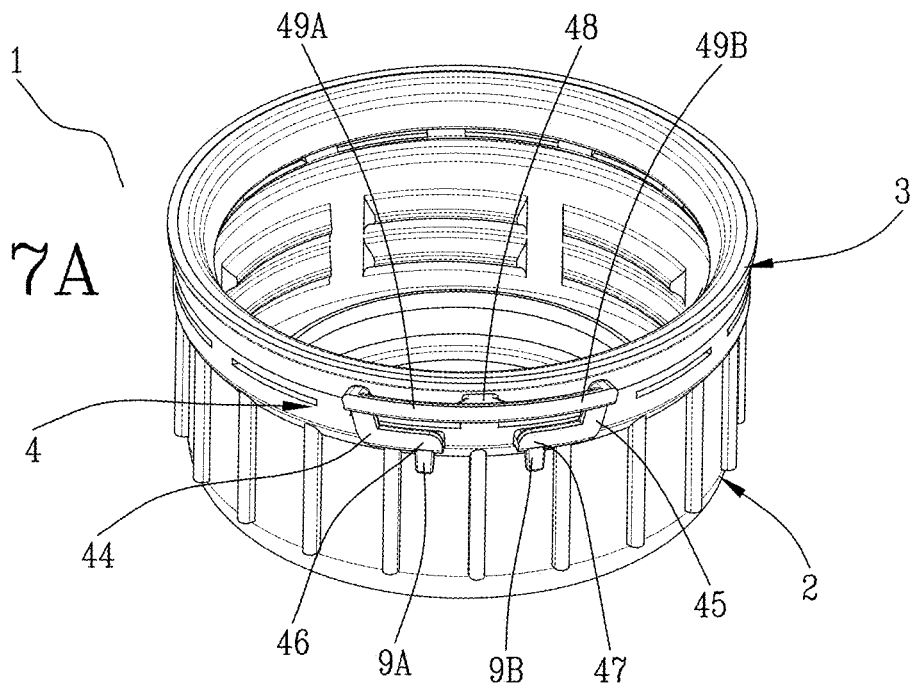
FIG. 17A illustrates a cap for a container according to a further embodiment of this disclosure in which it includes a connecting band including a first and second strip connected to a first, a second and a third bracket, and a pair of bosses configured to be locked together with wings of the third bracket.
Figure 17B:
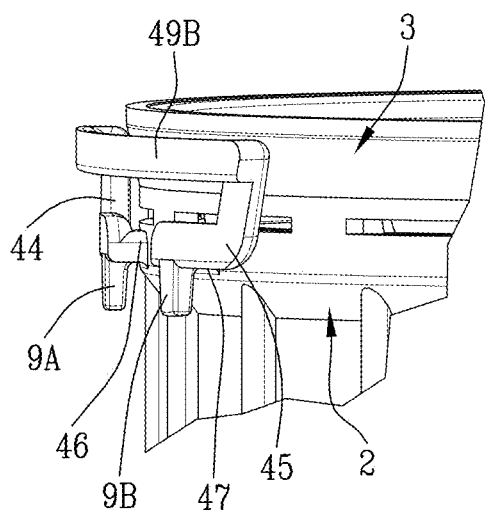
FIGS. 17B and 17C Illustrate details of the cap of FIG. 17 in a side view and a top view, respectively.
Figure 17C:
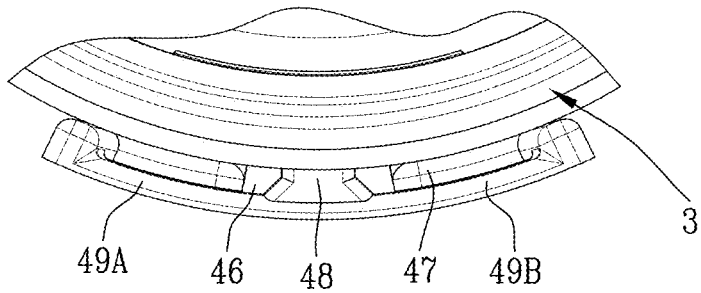
Figure 18A:
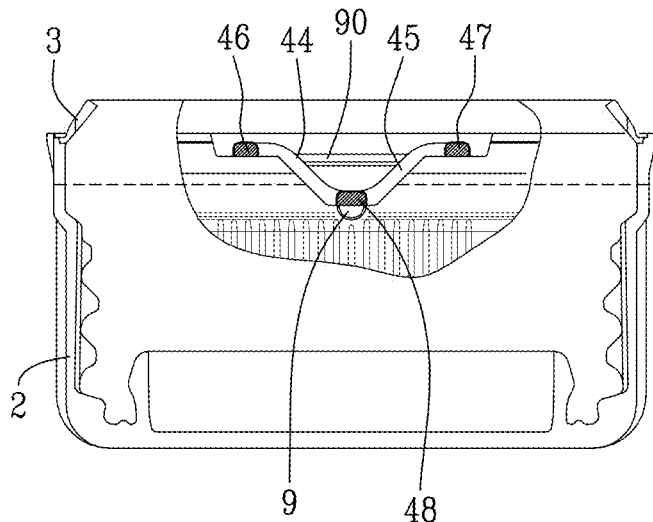
FIGS. 18A and 18B are, respectively, a front view and a side view of a cap for a container according to a further embodiment of it, in which the connecting band includes a first and second strip connected to a first, a second and a third bracket, and a boss configured to be locked together with a third strip which is connected across the first and the second bracket.
Figure 18B:
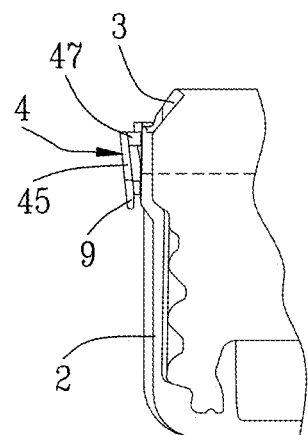
Figure 19A:
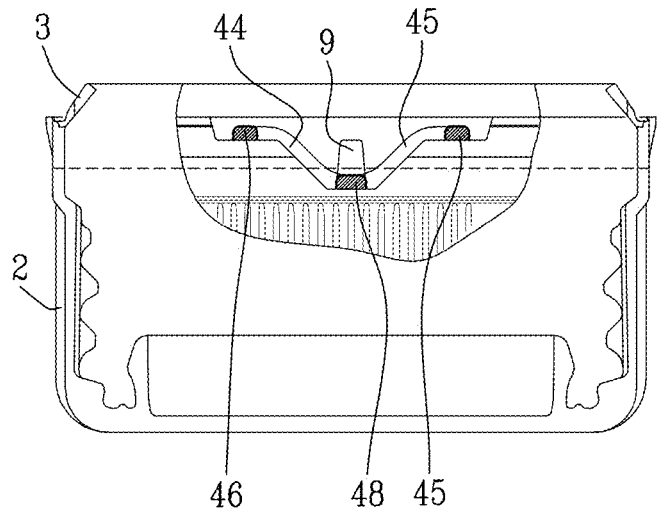
FIGS. 19A and 19B are, respectively, a front view and a side view of a cap for a container according to a further embodiment of it, in which the connecting band includes a first and second strip connected to a first and a second bracket, and a boss configured to interact with the side wall of the cap body.
Figure 19B:
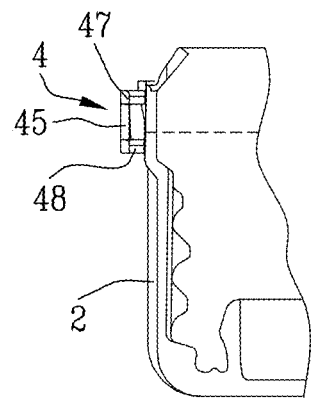
Figure 20A:
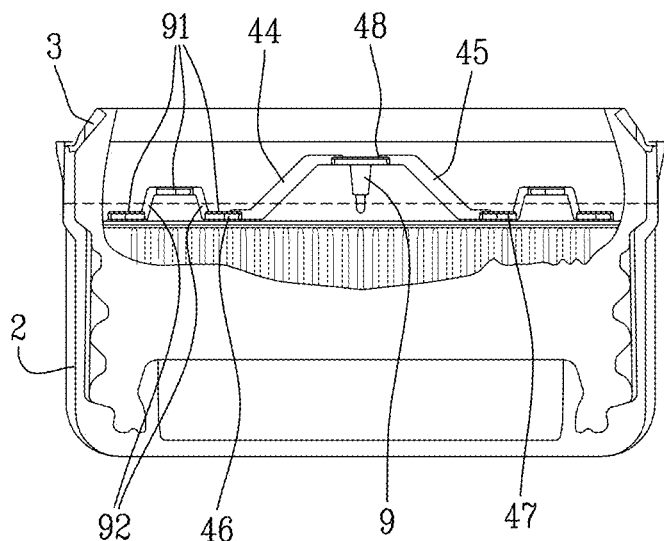
FIGS. 20A and 20B are, respectively, a front view and a side view of a cap for a container according to a further embodiment of it, in which the connecting band includes a first and second strip connected to brackets, and a boss configured to interact with the side wall of the cap body, and in which the joining portion includes additional brackets and additional strips intended to be torn when the cap is opened.
Figure 20B:
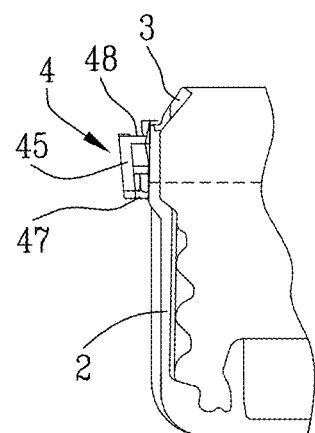
Figure 21A:
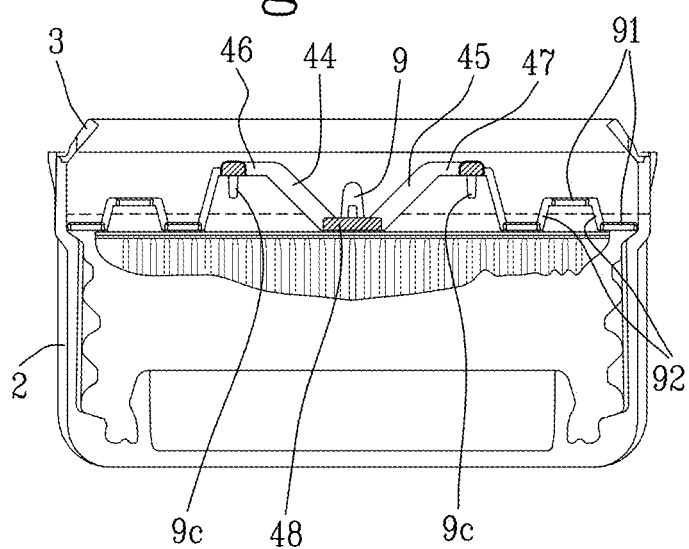
FIGS. 21A and 21B are, respectively, a front view and a side view of a cap for a container according to a further embodiment of it, in which the connecting band includes a first and second strip connected to brackets, and a boss configured to interact with the side wall of the cap body, and in which the joining portion includes additional brackets and additional strips intended to be torn when the cap is opened.
Figure 21B:
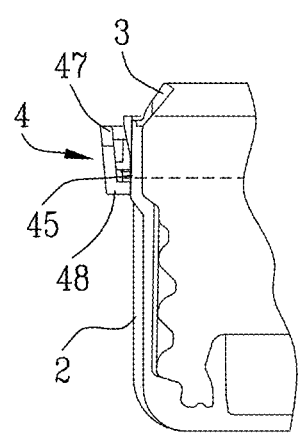

With reference to the accompanying drawings, the numeral 1 denotes a cap (or closure) for a container.

The cap 1 comprises a body 2. The body 2 is configured to be coupled to the neck of the container to close the container and uncoupled from the neck of the container to open the container. The body 2 comprises an internally threaded side wall 21 (that is, comprising an internal thread) to connect to a corresponding thread on the neck of the container. The side wall 21 extends around a longitudinal axis A. The side wall 21 is radially symmetric about the longitudinal axis A. The side wall 21 has a first end, annular in shape, and a second end, opposite to the first end and also annular in shape. The body 2 comprises a transverse wall 22, oriented transversely to the side wall and connected to the first end of the side wall 21. The transverse wall 22 is circular in shape.

The cap 1 comprises a tamper evident ring 3. The tamper evident ring 3 is configured to remain anchored to the neck of the container even when the cap body 2 is uncoupled from the neck. The tamper evident ring 3 includes a retaining portion 31 configured to engage a locking member on the neck of the container; the retaining portion 31 is annular in shape. The tamper evident ring 3 includes a joining portion 32, where the tamper evident ring 3 is joined to the cap body 2. The joining portion 32 includes a plurality of bridges or hinges which connect the retaining portion 31 to the transverse wall 21. The bridges are separated from each other by a corresponding plurality of windows. The joining portion 32 is configured to be torn along a full (circular) perimeter surrounding the longitudinal axis A, in response to a movement of the body 2 away from the tamper evident ring 3 (due to unscrewing the thread of the side wall 21 on the body 2 from the thread on the neck of the container).

The cap 1 also comprises a connecting band 4, connected to the side wall 21 of the body 2 and to the retaining portion 31 of the tamper evident ring 3. More specifically, the connecting band 4 has a first end 41 connected to the side wall 21 of the body 2 in a first connecting zone 210 (provided on the side wall 21) and a second end 42 connected to the retaining portion 31 of the tamper evident ring 3 in a second connecting zone 310 (provided on the retaining portion 31). It should be noted that, with reference to the direction of the longitudinal axis A, the joining portion 32 is located between the first connecting zone 210 and the second connecting zone 310.

In an embodiment, the connecting band 4 is shaped like a ribbon having a double curvature; more specifically, the ribbon has a first curvature about a first curvature axis C1, orthogonal to the longitudinal axis A, and a second curvature about a second curvature axis C2, parallel (or coincident) with the longitudinal axis A.

It should be noted that the connecting band 4, in embodiments like this one (that is where it is shaped like a ribbon having a double curvature) is made by moulding as a single part with the cap 1.

In an embodiment, the ribbon includes a hole 43 (for example, rhomboidal, square, rectangular, circular or elliptic in shape).

In an embodiment, the cap 1 includes a narrow thickness zone 5 (in the joining portion 32, in the side wall 21 or in the retaining portion 31). The narrow thickness zone 5 is interposed between the first connecting zone 210 and the second connecting zone 310. Preferably, the narrow thickness zone 5 is closer to the first connecting zone 210 than it is to the second connecting zone 310. More specifically, the narrow thickness zone 5 is defined by a limited angular portion of an annular zone of the cap 1; the narrow thickness zone 5 has a first thickness T1, in the radial direction; on the outside of the narrow thickness zone 5, the annular zone of the cap includes a nominal thickness zone having a second thickness T2, in the radial direction. The second thickness T2 is greater than the first thickness T1.

The narrow thickness zone 5 may include (or be defined by) an opening 51 (or through hole). The opening 51 is distinct from, and larger than, the windows of the joining portion 32.

In an embodiment, the connecting band 4 includes a first bracket 46 and a second bracket 47 connected to, and jutting from, the side wall 21 of the body 2 away from the longitudinal axis A. More specifically, the first and the second bracket 46 and 47 are located at the same (first) level along the longitudinal axis A, on different angular portions, spaced from each other. The connecting band 4 also includes a third bracket 48 connected to, and jutting from, the retaining portion 31 of the tamper evident ring 3, away from the longitudinal axis A. Thus, the third bracket 48 is located at a second level along the longitudinal axis A, different from the first level. Along the profile of the cap 1 around the longitudinal axis A, the first bracket 46, the second bracket 47 and the third bracket 48 are angularly offset (and spaced) from each other; the third bracket 48 is interposed between the first bracket 46 and the second bracket 47.

The first, second and third brackets 46, 47 and 48 may jut out away from the longitudinal axis A, perpendicularly to the longitudinal axis A or obliquely at an angle to the longitudinal axis A. More specifically, the first and the second bracket 46 and 47 may be inclined at an angle towards the third bracket 48 and/or the third bracket 48 may be inclined at an angle towards the first and second brackets 46, 47.

The first, second and third brackets 46, 47 and 48 are preferably the same thickness, parallel to the longitudinal axis A.

In embodiments like this one, the connecting band 4 also includes a first strip 44 and a second strip 45. The first strip 44 has a first end which is connected to the first bracket 46 and a second end which is connected to the third bracket 48. The second strip 45 has a first end which is connected to the second bracket 47 and a second end which is connected to the third bracket 48. It should be noted that the connecting band 4, in embodiments like this one (that is where it comprises brackets and strips) is made by moulding as a single part with the cap 1.

The first end of the first strip 44 and the first end of the second strip 45 are equidistant from the longitudinal axis A, that is to say, they are the same first distance from the longitudinal axis A. The second end of the first strip 44 and the second end of the second strip 45 are equidistant from the longitudinal axis A, that is to say, they are the same second distance from the longitudinal axis A. The second distance is greater than the first distance: thus, the first ends of the first and the second strip 44 are closer together than their second ends.

In an embodiment, the first strip 44 extends in (or includes a portion extending in) a first direction D1 and the second strip 45 extends in (or includes a portion extending in) a second direction D2, different from the first direction D1 and incident upon the first direction D1. More specifically, the first direction D1 and the second direction D2 converge towards the tamper evident ring 3 and diverge towards the cap body 2.

It should be noted that the first and second directions D1, D2 may be symmetrical or asymmetrical about the longitudinal axis A. More specifically, if the first and second directions D1, D2 are asymmetrical about the longitudinal axis A, the first strip 44 and the second strip 45 are different lengths.

In an embodiment, the first strip 44 includes a first horizontal portion 44A, connected to the first bracket 46 and a second horizontal portion 44B, connected to the third bracket 48. The first strip 44 also includes an oblique portion 44C extending in the first direction D1 between a first end connected to the first horizontal portion 44A and a second end connected to the second horizontal portion 44B. It should be noted that the first and second horizontal portions 44A and 44B have a thickness, measured parallel to the longitudinal axis A, that is greater than the first and third brackets 46 and 48, respectively.

Similarly, the second strip 45 includes a first horizontal portion 45A, connected to the second bracket 47 and a second horizontal portion 45B, connected to the third bracket 48. The second strip 45 also includes an oblique portion 450 extending in the second direction D2 between a first end connected to the first horizontal portion 45A and a second end connected to the second horizontal portion 45B. It should be noted that the first and second horizontal portions 45A and 45B have a thickness, measured parallel to the longitudinal axis A, that is greater than the second and third brackets 47 and 48, respectively.

Along a radial direction of the cap 1, the first and second strips 44, 45 may protrude with respect to the first, second and third brackets 46, 47, 48. Alternatively, the first and the second bracket 44 and 45 may be inscribed in the same circle as the first, second and third brackets 46, 47, 48.

Preferably, the first and second brackets 46, 47 have a corner (opposite to the third bracket 48) which is rounded, that is, which has a large curvature radius.

In one or more embodiments, the connecting band 4 is made by overmoulding after the cap body 2 and the tamper evident ring 3 have been formed. In these embodiments, the connecting band 4 is made of a different material than the body 2 and the tamper evident ring 3.

In an embodiment in which it is made by overmoulding, the connecting band 4 is in the shape of an H: that is to say, it has a pair of longitudinal front portions 411 which are parallel to, and spaced from, each other and a horizontal front portion 410 which is perpendicular to the longitudinal portions 411 and connected between them. Along a longitudinal direction parallel to the longitudinal axis A, the portion 410 is shorter than the portions 411.

Each of the portions 411 is fixed to the side wall 21 of the body 2 and to the retaining portion 31 of the tamper evident ring 3 by respective fastening portions 412 of the connecting band 4, oriented radially and operatively inserted in holes made in the side wall 21 and in the retaining portion 31. More specifically, the fastening portions 412 may be dovetail shaped, that is, larger in cross section size at the inside wall of the cap 1 and smaller in cross section size where they are connected to the portions 411. In another embodiment in which it is made by overmoulding, the connecting band 4 may include a plate 413 and two or more fastening portions 412, connected to the plate 413, oriented radially and operatively inserted in holes made in the side wall 21 and in the retaining portion 31.

The connecting band 4 in these embodiments (in which it is made by overmoulding) is movable (irreversibly) from a first position, before the cap is opened for the first time, to a second position, after the cap is opened for the first time. At the first position, the connecting band 4 is fully inscribed in a shape defined by the side wall 21 and by the tamper evident ring 3, whilst at the second position, it juts out from that shape. In effect, when the joining zone 32 is torn and the body 2 moved away from the tamper evident ring, the connecting band 4 is deformed and increases its length.

Thus, generally speaking, where the connecting band 4 is made by overmoulding, it includes at least a first fastening portion 412 operatively inserted in a radial hole made in the retaining portion 31 of the tamper evident ring, a second fastening portion 412 operatively inserted in a radial hole made in the side wall 21 and a deformable portion connected to the first and second fastening portions 412. The deformable portion may include the plate 413 and have the shape of an H or other shapes. Before the cap is opened for the first time, the deformable portion is at the first position, where it is inscribed in the shape defined by the side wall 21 and by the tamper evident ring 3, and after the cap is opened for the first time, it is at the second position, where it is extended and juts out from that shape.

This disclosure also provides a mould 6 for forming the cap 1.

The mould 6 includes an upper unit 61 and a lower unit 62, movable towards and away from each other along an axis of the mould 6 which, operatively (when the cap 1 is formed in the mould 6), coincides with the longitudinal axis A. More specifically, the upper unit 61 and the lower unit 62 are movable between a spaced-apart position, to define an open configuration of the mould 6, and a close-together position, to define a closed configuration of the mould 6.

The lower unit 62 includes (or defines) a cavity 62A.

The upper unit 61 includes a core 611. The core 611 is configured to penetrate the cavity 62A, in the closed configuration of the mould 6.

More specifically, the core 611 includes an inner core 611A, a central core 611B and an outer core 611C. The outer core 611C surrounds the central core 611B which in turn surrounds the inner core 611A. The inner core 611A, the central core 611B and the outer core 611C are movable relative to each other along the longitudinal axis A; more specifically, in a possible embodiment, the inner core 611A and the outer core 611C are stationary, whilst the central core 611B is movable.

The upper unit 61 also includes an extractor 612, which surrounds the core 611 and is movable relative to the core 611 (that is, relative to the inner core 611A, the central core 611B and the outer core 611C) along the longitudinal axis A. The central core 611B includes a plurality of recesses configured to form the internal thread on the side wall of the cap.

In an opening sequence of the mould 6, there is first of all a downward movement of all the components except the outer core 611C and the inner core 611A (in practice equivalent to an upward movement of the outer core 611C and of the inner core 611A); at this stage, the central core 611B and the cavity 62A remain adherent to the cap 1. After that, a specific actuator causes a downward movement of the cavity 62A away from the upper unit 61 and from the cap 1, thereby releasing an outside wall of the cap 1; at this stage, the central core 611B remains adherent to an inside wall of the cap 1. After that, the extractor 612 moves downwards and, being in contact with the upper edge of the cap 1, entrains the cap 1 downwards with it; at first, the cap 1, pushed downwards by the extractor 612, entrains the central core 611B with it until the central core 611B reaches a stop shoulder (defined, for example, by the inner core 611A, which is stationary). When the central core 611B reaches the stop shoulder, the extractor 612 continues moving downwards and (if necessary with the aid of compressed air injected between the inner core 611A and the central core 611B) elastically deforms the side wall of the cap 1, until extracting the internal thread from the recesses of the central core 611B and releasing the inside wall of the cap 1.

In an embodiment, the mould 6, in order to form the connecting band 4, includes a first transverse element 63 and a second transverse element 64, movable towards and away from each other along a transverse direction T (orthogonal to the longitudinal axis A). More specifically, the first transverse element 63 and the second transverse element 64 are movable between a spaced-apart position and a close-together position. Along the longitudinal direction, the first and second transverse elements 63, 64 are interposed between the cavity 62A and the extractor 612 and are slidable on the cavity 62A; also, it should be noted that an interstice or clearance is defined between the first and second transverse elements 63, 64 and the extractor 612. Along a radial direction, the first and second transverse elements 63, 64 are located on the outside of the core 611.

When opening the mould, the first and second transverse elements 63, 64, if provided, move away from each other (to pass from the close-together position to the spaced-apart position) before the downward movement of all the components except the outer core 611C and the inner core 611A.

The inside of the mould 6 defines a forming cavity 7 for forming the cap 1. The forming cavity 7 includes a side hollow 71, extending around the longitudinal axis A, and a transverse hollow 72, oriented transversely to the side hollow 71 and connected to one end of the side hollow 71. The transverse hollow 72 is configured to form the transverse wall 22 of the cap 1. The side hollow 71 includes a body zone 711, a joining zone 712 and a tamper evidence zone 713. The body zone 711, the joining zone 712 and a tamper evidence zone 713 each extend around the longitudinal axis A (and are thus annular in shape). The joining zone 712 is interposed between the body zone 711 and the tamper evidence zone 713. The body zone 711 has a first end which is connected to the transverse hollow 72 and a second end which is connected to the joining zone 712. It should be noted that the joining zone 712 is configured to create the joining portion 32 of the cap 1; the joining zone 712 is configured to create a pre-weakened portion in the joining portion 32 or, alternatively, the pre-weakened portion is created after forming (for example, with a cutting device).

The forming cavity 7 also includes a bypass hollow 73, which has a first end 731 in fluid communication with the body zone 711, and a second end 732 in fluid communication with the tamper evidence zone 713. The bypass hollow 73 is distinct from the joining zone 712; more specifically, the bypass hollow 73 is angularly limited and located on the outside of the joining zone 712. The bypass hollow 73 is configured to form the connecting band 4.

It should be noted that in the close-together position, in an embodiment with the first transverse element 63 and the second transverse element 64, the bypass hollow 73 is delimited by these two elements. In effect, at least one between the first and the second transverse element 63, 64 includes, on the face of it which, in the close-together position in which it is in contact with the other between the first and the second transverse element 63, 64, a recess in the shape of the connecting band 4 to delimit the bypass hollow 73. Also, the first and second transverse elements 63, 64 act in conjunction with the upper unit 61 and the lower unit 62 to delimit the side hollow 71 and the transverse hollow 72.

The first and second transverse elements 63, 64 may also comprise a jutting portion that juts towards the longitudinal axis A, to form a constriction 714 in the side hollow 71.

It should be noted that the first and second transverse elements 63, 64 are configured to form the connecting band 4 in the embodiment in which it has the shape of a ribbon. The first and second transverse elements 63, 64 are not, however, necessary to form the connecting band 4 in the embodiment in which it includes the first, second and third brackets 46, 47, 48 and the first and second strips 44, 45. In effect, the lower unit 62 (specifically the cavity 62A) and the upper unit 61 (specifically the extractor 612) may be shape matched to define, in the closed configuration of the mould, an annular contact surface which includes a portion S1 which lies in a closing plane P (orthogonal to the longitudinal axis A), portions S2', S2'', S2''' and S2'''' which are inclined to the closing plane P, and portions S3', S3'' and S3''' which are parallel to the closing plane P but offset from the closing plane P. More specifically, the portions S3' and S3''' are the same distance from the closing plane P, greater than the distance of the portion S3 from the closing plane P. The portion S1 extends around the longitudinal axis A in the area not covered by the bypass hollow 73. The bypass hollow 73 is, on the other hand, delimited by the portions S2', S2'', S2''', S2'''' inclined to, and the portions S3', S3'', S3''' parallel to, the closing plane P.

In effect, the upper unit 61 (specifically the extractor 612) includes, in the angular portion of it covered by the bypass hollow 73, a pair of protuberances jutting from the closing plane P (in the longitudinal direction parallel to the longitudinal axis A). The lower unit 62 (specifically the cavity 62A) includes, in the angular portion of it covered by the bypass hollow 73, a pair of spaces extending away from the upper unit 61. In the closed configuration of the mould 6, the protuberances penetrate the spaces to delimit the portions S2', S2'', S2''', S2'''' inclined to, and the portions S3', S3'', S3''' parallel to, the closing plane P of the annular contact surface between the lower unit 62 and the upper unit 61.

One edge of the protuberances and one edge of the spaces have recesses defined in them. Thus, when the protuberances penetrate the spaces in the closed configuration of the mould and come into contact with each other to define the contact surface, the recesses delimit the bypass hollow 73. More specifically, in this embodiment, the bypass hollow 73 includes: a first bracket hollow 736, a second bracket hollow 737 and a third bracket hollow 738. The first and the second bracket hollow 736, 737 are in communication with the body zone 711 and jut out from the body zone 711. The third bracket hollow 738 is in communication with the tamper evidence zone 713 and juts out from the tamper evidence zone 713.

The first, second and third bracket hollows 736, 737, 738 are defined by recesses of the protuberances and/or of the spaces at the contact surface portions S3 parallel to the closing plane P but offset from the closing plane P.

More specifically, the following features are located in succession along the profile of the cap around the longitudinal axis A:
- a first inclined portion S2' connected to the portion S1 lying in the closing plane P;
- a first portion S3' parallel to the closing plane P, connected to a first inclined portion S2' and in which the first bracket hollow 736 is defined;
- a second inclined portion S2'', connected to the first parallel portion S3 and in which the first strip hollow 734 is defined;
- a second portion S3'' parallel to the closing plane P, connected to the second inclined portion S2'' and in which the third bracket hollow 738 is defined;
- a third inclined portion S2''', connected to the second parallel portion S3'' and in which the second strip hollow 735 is defined;
- a third portion S3''' parallel to the closing plane P, connected to the third inclined portion S2''' and in which the second bracket hollow 737 is defined;
- a fourth inclined portion S2'''' connected to the third portion S3''' and to the portion S1 lying in the closing plane P.

It should be noted that along a profile of the cap 1 around the longitudinal axis, the length of the first portion S3' parallel to the closing plane P is greater than the length of the first bracket hollow 736. Similarly, the length of the second portion S3'' parallel to the closing plane P is greater than the length of the third bracket hollow 738. The length of the third portion S3''' parallel to the closing plane P is greater than the length of the second bracket hollow 737. That way, the brackets can be shaped to have rounded edges, which facilitate filling the bypass hollow.

In a possible variant embodiment, the core 611 (specifically, the central core 611B) might include a boss 6110, or protrusion, in a zone in front of the bypass hollow 73. The boss 6110 extends along the direction of the longitudinal axis A at least from the first bracket hollow 736 to the third bracket hollow 738; preferably, the boss 6110 extends along the longitudinal direction A from the first bracket hollow 736 up to the closing plane P.

Furthermore, the boss 6100 extends angularly around the longitudinal axis A at least from the first bracket hollow 736 to the second bracket hollow 737. Consequently, the side hollow zone 71 in front of the bypass hollow 73 is, in the radial direction, smaller in thickness than the zone not covered by the bypass hollow 73; this creates a constriction 714 which facilitates filling the bypass hollow 73.

In at least one embodiment where the connecting band 4 is made by overmoulding, overmoulding is carried out with the same upper unit 61 as the one used for moulding the body 2 and the tamper evident ring 3 and with a different lower unit 62.

In an embodiment, the connecting band 4 comprises a first and a second bracket 46, 47 jutting from the side wall 21 of the body 2, a third bracket 48 jutting from the tamper evident ring 3, a first strip 44 connected across the first bracket 46 and the third bracket 48, and a second strip 45 connected across the second bracket 47 and the third bracket 48; the third bracket 48 includes side wings 49A and 49B which extend along a circumferential direction starting from the portion of the third bracket 48 joined to the tamper evident ring; the first and the second strip 44, 45 are joined to the side wings 49A and 49B of the third bracket 48. The connecting band 4 preferably also comprises a first and a second boss 9A, 9B which jut out from the first and the second bracket 46, 47, respectively, towards the transverse wall 22 of the cap 1. When the cap 1 is in an open configuration, the first and the second boss 9A and 9B lock together with the wings 49A and 49B of the third bracket 48 (that is, between the wings 49A, 49B and the tamper evident ring 3); this prevents the cap 1 from returning elastically to a closed configuration of the cap.

It is observed that it is here called closed configuration of the cap a configuration wherein the body of the cap is coupled relative to the thread provided on the neck of the container; so, the first and second operating configurations both define a closed configuration. It is here called open configuration of the cap a configuration wherein the body of the cap is uncoupled relative to the thread provided on the neck of the container.

In an embodiment, the connecting band 4 comprises a first and a second bracket 46, 47 jutting from the tamper evident ring 3, a third bracket 48 jutting from the side wall 21 of the body 2, a first strip 44 connected across the first bracket 46 and the third bracket 48, and a second strip 45 connected across the second bracket 47 and the third bracket 48. The connecting band 4 preferably also comprises a boss 9 which extends from the third bracket 48 towards the side wall 22 of the body 2, and a third strip (or tie strip) 90 interconnected between the first and the second bracket 46, 47. The boss 9 is configured to be locked together with the third strip 90 (that is, across the third strip 90 and the tamper evident ring 3); this prevents the cap 1 from returning elastically to a closed configuration.

In an embodiment, the connecting band 4 includes a first bracket and a second bracket 46, 47 connected to the tamper evident ring 3, and a third bracket 48 connected to the side wall 21 of the body 2; the connecting band preferably also comprises a boss 9 which juts out from a surface of the third bracket 48 facing towards the tamper evident ring; the boss 9 is configured to interact with the neck of the container in an open configuration of the cap 1 to prevent the cap 1 from returning elastically to a closed configuration.

In one or more embodiments, the joining portion 32 includes joining brackets 91 and joining strips 92; the joining brackets 91 are similar to the brackets 46, 47, 48 and the joining strips 92 are similar to the strips 44, 45 but are smaller in size; the joining strips 92 are intended to be torn when the cap 1 is opened. Unlike traditional bridges, these joining strips 92 and joining brackets 91 are positioned on the outside of the space inside the cap 1; they are therefore useful in those cases where the joining zone 32 is scored by an uninterrupted cut made on the inside of the cap 1: in effect, the cut made on the inside scores the side wall 21 but does not sever the joining strips 92 positioned on the outside of the side wall 21.

It is also provided that a (first) joining strip 91 is connected to the first bracket 46 and a (last) joining strip 92 is connected to the second bracket 47.

The joining brackets 91 and the joining strips 92 may be provided in an embodiment in which the first and the second bracket 46, 47 are connected to the side wall 21 of the body 2 and the third bracket 48 is connected to the tamper evident ring 3; in this embodiment, there may be a boss 9 which juts out from a surface of the third bracket 48 facing towards the body 2 and which is configured to interact with the side wall 21 of the body 2 when the cap 1 is in an open configuration.

The joining brackets 91 and the joining strips 92 may be provided in an embodiment in which the first and the second bracket 46, 47 are connected to the tamper evident ring 3 and the third bracket 48 is connected to the side wall 21 of the body 2; in this case, there may be a boss 9 which juts out from a surface of the third bracket 48 facing towards the tamper evident ring 3 and configured to interact with the neck of the container when the cap 1 is in an open configuration so as to stop the cap 1 from returning elastically to the closed configuration; there may also be provided additional bosses 90 jutting from respective surfaces of the first and the second bracket 46, 47 facing towards the body 2; the additional bosses 9C are configured to interact with the side wall 21 of the body 2 when the cap 1 is in an open configuration so as to stop the cap 1 from returning elastically to the closed configuration.

In an embodiment, the connecting band 4 includes a single bracket 48 connected to the side wall 21 of the body 2 and a strap connected to the bracket 48 and to the tamper evident ring 3. The strap may include a hole 43. In this embodiment, the connecting band 4 may also include a first and a second boss 9A, 9B connected to the bracket 48 (preferably on opposite sides of the strap) and configured to interact with the neck of the container when the cap 1 is in an open configuration, so as to stop the cap 1 from returning elastically to the closed configuration.

It should be noted that the features described above in connection with the brackets, the strips and the bosses are reflected in possible configurations of the mould; more specifically, in the embodiments where there are three brackets and two strips, the lower unit 62 and the upper unit 61 of the mould may be shaped to match each other to make the first, second and third brackets 46, 47, 48 and the first and second strips 48, 49 and, if provided, also the one or more bosses 9, 9A, 9B, 9C. In the embodiment with a single bracket 48 jutting from the side wall 21 of the body 2, and a strap connected to the bracket 48 and to the tamper evident ring 3, the mould may comprise a transverse member 63 configured to make the connecting band 4.

The invention claimed is:
1. A cap for a container, comprising:
a body configured to be coupled and uncoupled relative to the neck of the container and including:
  a side wall, which is internally threaded and extends around a longitudinal axis between a first and a second end, and
  a transverse wall joined to the first end of the side wall;
a tamper evident ring, configured to remain anchored to the neck of the container even when the cap body is uncoupled from the neck, and including:
  a retaining portion, configured to engage a locking member on the neck of the container, and
  a joining portion, where the tamper evident ring is joined to the cap body, the joining portion being configured to be torn along a full perimeter surrounding the longitudinal axis in response to a movement of the body away from the tamper evident ring,
wherein the cap further comprises a connecting band having a first end connected to the side wall of the body and a second end connected to the retaining portion of the tamper evident ring, wherein the connecting band extends, without interruptions, between the first end and the second end, the first end being connected to the side wall of the body in a first connecting zone and the second end of the connecting band being connected to the retaining portion of the tamper evident ring in a second connecting zone, so that the cap can be positioned in:
a first operating configuration, where the retaining portion of the tamper evident ring engages the locking member of the container neck, the cap body is coupled to the container neck and the tamper evident ring is joined to the cap body both by the joining portion of the tamper evident ring and by the connecting band, and
a second operating configuration, where the retaining portion of the tamper evident ring engages the locking member of the container neck, the cap body is uncoupled from the container neck and the tamper evident ring is joined to the cap body by the connecting band but is separated from the cap body at the joining portion which is torn,
wherein the first end of the connecting band is connected to the side wall of the body in a first connecting zone of the side wall of the body and the second end of the connecting band is connected to the retaining portion of the tamper evident ring in a second connecting zone of the retaining portion,
wherein the cap further comprises a narrow thickness zone located between the first connecting zone and the second connecting zone, wherein the narrow thickness zone is defined in the side wall of the body and/or in the tamper evident ring, and
wherein the narrow thickness zone is interposed between the first connecting zone and the second connecting zone and is defined by a limited angular portion of an annular zone of the cap, the narrow thickness zone being defined in the side wall of the body and/or in the tamper evident ring.

2. The cap according to claim 1, wherein the connecting band, in the first operating configuration, protrudes from the side wall of the cap body and from the retaining portion of the tamper evident ring, away from the longitudinal axis.

3. The cap according to claim 2, wherein in the first operating configuration, the length of the connecting band from the first end to the second end is greater than the distance between the first connecting zone and the second connecting zone.

4. The cap according to claim 2, wherein the joining portion includes, in the first operating configuration, a plurality of bridges and a plurality of windows, wherein the bridges of the plurality of bridges constitute a connection between the tamper evident ring and the body and are alternated with the windows of the plurality of windows and wherein the narrow thickness zone includes an opening which is greater in length than each window of the plurality of windows.

5. The cap according to claim 1, wherein the connecting band is shaped like a ribbon having a double curvature, wherein the ribbon has a hole made in it.

6. The cap according to claim 1, wherein the connecting band includes a first strip and a second strip, wherein, in the first operating configuration and in the second operating configuration, the cap body is joined to the tamper evident ring both by the first strip and by the second strip.

7. The cap according to claim 6, wherein the connecting band includes a first bracket, a second bracket and a third bracket, jutting out away from the longitudinal axis,
wherein the first and the second bracket jut out from the side wall of the body and the third bracket juts out from the retaining portion of the tamper evident ring or, vice versa, the first and the second bracket jut out from the retaining portion of the tamper evident ring and the third bracket juts out from the side wall of the body,
and wherein along a profile of the cap around the longitudinal axis, the first bracket, the second bracket and the third bracket are angularly offset from each other and the third bracket is interposed between the first bracket and the second bracket,
wherein the first strip has a first end which is connected to the first bracket and a second end which is connected to the third bracket and wherein the second strip has a first end which is connected to the second bracket and a second end which is connected to the third bracket.

8. The cap according to claim 7, wherein the connecting band comprises at least one boss which extends from one between the first, the second or the third bracket in parallel with the longitudinal axis, wherein the boss is spaced from the body and from the tamper evident ring.

9. The cap according to claim 8, wherein the at least one boss extends from a surface of one between the first, the second and the third bracket jutting from the tamper evident ring and facing towards the transverse wall of the body and is configured to interact with the side wall of the body when the cap is in the open configuration.

10. The cap according to claim 8, wherein the at least one boss extends from a surface of one between the first, the second or the third bracket jutting from the side wall of the body and facing towards the tamper evident ring and is configured to lock together with a portion of the connecting band when the cap is in the open configuration.

11. The cap according to claim 8, wherein the boss extends from a surface of one between the first, the second and the third bracket jutting from the side wall and facing towards the tamper evident ring and is configured to interact with the neck of the container when the cap is in an open configuration.

12. The cap according to claim 7, wherein the third bracket includes:
a central portion joined to the tamper evident ring or to the side wall of the body,
a first and a second wing extending from the central portion, away from each other, as far as respective ends, wherein the second end of the first strip and the second end of the second strip are connected to the ends of the first wing and of the second wing, respectively.

13. The cap according to claim 7, wherein the first bracket and the second bracket jut out from the side wall of the body, away from the longitudinal axis and the third bracket juts out from the retaining portion of the tamper evident ring away from the longitudinal axis.

14. The cap according to claim 13, wherein the first strip includes a portion extending in a first direction and the second strip includes a portion extending in a second direction, different from the first direction, wherein the first direction and the second direction converge towards the tamper evident ring and diverge towards the cap body.

15. The cap according to claim 13, wherein the first bracket, the second bracket and the third bracket extend outwardly away from the longitudinal axis and are obliquely inclined at an angle to the longitudinal axis, wherein the first bracket and the second bracket are inclined to the longitudinal axis towards the third bracket and the third bracket is inclined to the longitudinal axis towards the first bracket and the second bracket.

16. The cap according to claim 7, wherein the first bracket and the second bracket jut out from the retaining portion of the tamper evident ring and the third bracket juts out from the side wall of the body.

17. The cap according to claim 16, wherein the connecting band comprises:
a third strip with a first end connected to the first bracket and a second end connected to the second bracket;
a boss which extends from the third bracket in parallel with the longitudinal axis and towards the transverse wall of the body, wherein the boss is configured to lock together with the third strip when the cap is in an open configuration.

18. The cap according to claim 1, comprising:
a plurality of joining brackets jutting from the retaining portion of the tamper evident ring away from the longitudinal axis;
a plurality of additional joining brackets jutting from the side wall of the body away from the longitudinal axis;
a plurality of joining strips, each having a first end which is connected to a joining bracket of the plurality and a second end which is connected to an additional joining bracket of the plurality, wherein the joining strips are configured to be torn in response to a movement of the body away from the tamper evident ring and define the joining portion of the tamper evident ring.

19. The cap according to claim 1, wherein the body and the tamper evident ring include a first material and the connecting band includes a second material, different from the first material.

20. The cap according to claim 1, wherein the side wall includes an internal thread which extends between a starting end and a finishing end, wherein the starting end is closer to the tamper evident ring than the finishing end and wherein along a profile of the cap around the longitudinal axis, the connecting band has a predetermined angular position relative to the starting end of the internal thread.

21. A cap for a container, comprising:
a body configured to be coupled and uncoupled relative to the neck of the container and including:
a side wall, which is internally threaded and extends around a longitudinal axis between a first and a second end, and a transverse wall joined to the first end of the side wall;
a tamper evident ring, configured to remain anchored to the neck of the container even when the cap body is uncoupled from the neck, and including:
  a retaining portion, configured to engage a locking member on the neck of the container, and
  a joining portion, where the tamper evident ring is joined to the cap body, the joining portion being configured to be torn along a full perimeter surrounding the longitudinal axis in response to a movement of the body away from the tamper evident ring,
wherein the cap further comprises a connecting band having a first end connected to the side wall of the body and a second end connected to the retaining portion of the tamper evident ring, wherein the connecting band extends, without interruptions, between the first end and the second end, the first end being connected to the side wall of the body in a first connecting zone and the second end of the connecting band being connected to the retaining portion of the tamper evident ring in a second connecting zone, so that the cap can be positioned in:
a first operating configuration, where the retaining portion of the tamper evident ring engage the locking member of the container neck, the cap body is coupled to the container neck and the tamper evident ring is joined to the cap body both by the joining portion of the tamper evident ring and by the connecting band, and in:
a second operating configuration, where the retaining portion of the tamper evident ring engages the locking member of the container neck, the cap body is uncoupled from the container neck and the tamper evident ring is joined to the cap body by the connecting band but is separated from the cap body at the joining portion which is torn,
wherein the connecting band includes a first strip and a second strip, wherein, in the first operating configuration and in the second operating configuration, the cap body is joined to the tamper evident ring both by the first strip and by the second strip,
wherein the connecting band includes a first bracket, a second bracket and a third bracket, jutting out away from the longitudinal axis,
wherein the first and the second bracket jut out from the side wall of the body and the third bracket juts out from the retaining portion of the tamper evident ring or, vice versa, the first and the second bracket jut out from the retaining portion of the tamper evident ring and the third bracket juts out from the side wall of the body,
wherein along a profile of the cap around the longitudinal axis, the first bracket, the second bracket and the third bracket are angularly offset from each other and the third bracket is interposed between the first bracket and the second bracket, and
wherein the first strip has a first end which is connected to the first bracket and a second end which is connected to the third bracket and wherein the second strip has a first end which is connected to the second bracket and a second end which is connected to the third bracket.

* * * * *